US009967427B2

(12) United States Patent
Ooba

(10) Patent No.: US 9,967,427 B2
(45) Date of Patent: May 8, 2018

(54) COMMUNICATION SYSTEM, INFORMATION PROCESSING APPARATUS, PRINT CONTROL APPARATUS, METHODS OF RESPECTIVELY CONTROLLING THEM, AND STORAGE MEDIUM

(71) Applicant: CANON KABUSHIKI KAISHA, Tokyo (JP)

(72) Inventor: Hideaki Ooba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/410,822

(22) Filed: Jan. 20, 2017

(65) Prior Publication Data
US 2017/0214824 A1 Jul. 27, 2017

(30) Foreign Application Priority Data

Jan. 26, 2016 (JP) .................. 2016-012792

(51) Int. Cl.
*G06F 15/00* (2006.01)
*H04N 1/327* (2006.01)
(Continued)

(52) U.S. Cl.
CPC ......... *H04N 1/32776* (2013.01); *G06F 3/121* (2013.01); *H04L 41/085* (2013.01);
(Continued)

(58) Field of Classification Search
CPC ........... H04N 1/32776; H04N 1/00344; H04N 2201/0094; H04N 2201/0075
See application file for complete search history.

(56) References Cited

U.S. PATENT DOCUMENTS

2009/0237728 A1* 9/2009 Yamamoto ............ G06F 3/1454
358/1.15
2011/0157638 A1 6/2011 Yamada
(Continued)

FOREIGN PATENT DOCUMENTS

JP 2015-032224 2/2015

OTHER PUBLICATIONS

European Search Report issued in corresponding European Application No. 17152147.9 dated Jun. 30, 2017.

*Primary Examiner* — Saeid Ebrahimi Dehkordy
(74) *Attorney, Agent, or Firm* — Fitzpatrick, Cella, Harper & Scinto

(57) ABSTRACT

A communication system in which a terminal device and an information processing apparatus are connected via a network, and an image forming apparatus is connected to the information processing apparatus. The terminal device transmits a VNC connection request to the image forming apparatus via the network, as a VNC client. The information processing apparatus relays communication between the terminal device and the image forming apparatus, and transmits an operation screen for the information processing apparatus to the VNC client. Upon receiving the VNC connection request via the information processing apparatus, the image forming apparatus transfers the VNC connection request to the information processing apparatus. Also, the image forming apparatus executes VNC communication with the terminal device via the information processing apparatus, and performs control to transfer the VNC communication to the information processing apparatus.

19 Claims, 29 Drawing Sheets

(51) Int. Cl.
*H04N 1/00* (2006.01)
*H04L 12/24* (2006.01)
*H04L 29/08* (2006.01)
*G06F 3/12* (2006.01)

(52) U.S. Cl.
CPC ............ *H04L 41/22* (2013.01); *H04L 67/025* (2013.01); *H04N 1/00344* (2013.01); *H04N 1/00408* (2013.01); *H04L 41/0866* (2013.01); *H04L 41/5074* (2013.01); *H04N 2201/0039* (2013.01); *H04N 2201/0075* (2013.01); *H04N 2201/0094* (2013.01)

(56) References Cited

U.S. PATENT DOCUMENTS

| 2014/0043632 A1* | 2/2014 | Uchida | G06F 3/1297 358/1.13 |
| 2015/0036178 A1 | 2/2015 | Nakamura | G06F 3/1236 |

* cited by examiner

FIG. 8A

| SERIAL NUMBER | MODEL NAME | CUSTOMER NAME | SERVICE PERSON NAME |
|---|---|---|---|
| SN0001 | MFP1 | COMPANY A | serv1 |
| SN0002 | MFP1 | COMPANY B | serv2 |
| SN0003 | MFP2 | COMPANY C | serv2 |
| SN0004 | MFP3+DFE | COMPANY A | serv1 |

FIG. 8B

| SERIAL NUMBER | MODEL NAME | CUSTOMER NAME | DEVICE CONNECTION DATE AND TIME | SERVICE CONNECTION DATE AND TIME | RESPONSIBLE SERVICE PERSON NAME | CONNECTION ID |
|---|---|---|---|---|---|---|
| SN0001 | MFP1 | COMPANY A | 2012/10/31 13:00 | 2012/10/31 13:01 | serv1 | 1234 |
| SN0002 | MFP1 | COMPANY B | 2012/10/31 13:05 | | | 5678 |
| SN0004 | MFP3+DFE | COMPANY A | 2012/10/31 13:10 | | | 9012 |

F I G. 29
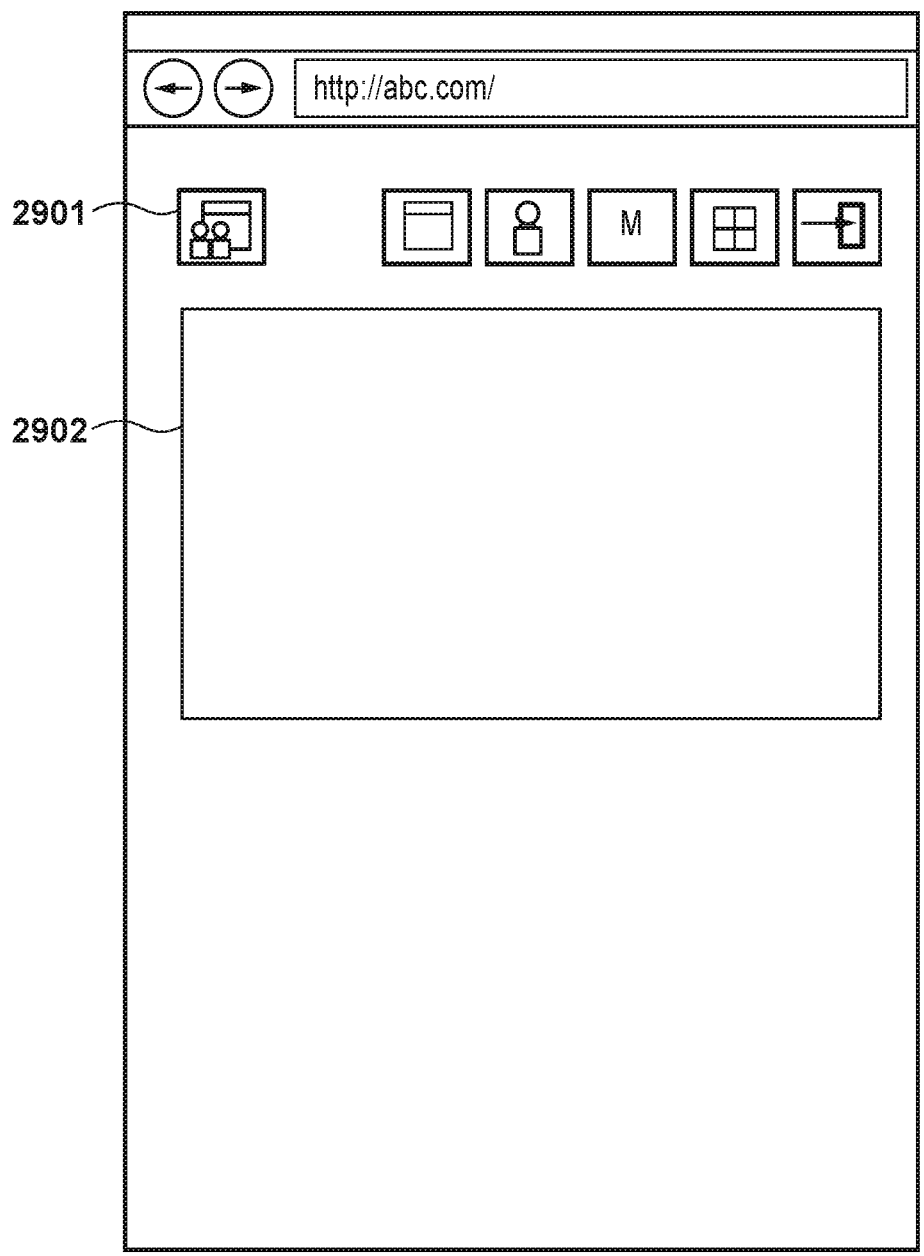

COMMUNICATION SYSTEM, INFORMATION PROCESSING APPARATUS, PRINT CONTROL APPARATUS, METHODS OF RESPECTIVELY CONTROLLING THEM, AND STORAGE MEDIUM

BACKGROUND OF THE INVENTION

Field of the Invention

The present invention relates to a communication system, an information processing apparatus, a print control apparatus, methods of respectively controlling them, and a storage medium.

Description of the Related Art

It is common that, if there is an issue with an information processing apparatus, the customer who purchased the information processing apparatus finds how to address the issue by, for example, directly making a call to a call center of the manufacturer, and if the issue still cannot be solved, a service person from the manufacturer visits the customer to solve the issue. If a service person visits a customer, in some cases, a lot of time is required before the issue is solved. For example, time is spent arranging a time to visit, time is spent travelling, and time is spent visiting again after work if the service person does not have the necessary equipment with him/her. For this reason, a remote maintenance system has been conceived of. In this system, a terminal device such as a personal computer in a call center remotely connects to an information processing apparatus via a network, so that an operation screen or the like of the information processing apparatus can be directly operated from the call center.

In the case of an image forming apparatus, for example, such a system can be realized by using a virtual network computing (VNC) server function, which is one of the server functions that are supported by the image forming apparatus. By using a VNC server in this way, it is possible to enable the screen of a terminal device in the call center to display the operation screen of the image forming apparatus. Consequently, an operator or a service person at the call center can operate the operation screen of the image forming apparatus from the call center as if he/she is in front of the image forming apparatus (see Japanese Patent Laid-Open No. 2015-032224).

In some cases, a print control apparatus (print server) that performs image processing in conjunction with an image forming apparatus is connected to an image forming apparatus. Such a print control apparatus is connected directly to an image forming apparatus, using a network cable or a dedicated cable, and the print control apparatus is connected to a local area network (LAN). In other words, the image forming apparatus is connected to the network via the print control apparatus. In such a configuration, the VNC server function of the image forming apparatus usually cannot be used from a terminal device on the LAN, and therefore a network address translation (NAT) function is implemented in the print control apparatus. With this function, upon receiving a connection request from a terminal device on the LAN to connect to the VNC server of the image forming apparatus, the print control apparatus transfers the connection request to the image forming apparatus. Consequently, it is possible to use the VNC server function of the image forming apparatus from the terminal device on the LAN.

However, with the above-described conventional technology, in the case of a system in which an image forming apparatus is connected to a network via a print control apparatus, there is a problem in which it is impossible to effectively perform remote maintenance of the image forming apparatus from a call center. Specifically, upon receiving remote maintenance access (access to the VNC server) from the call center, the print control apparatus transfers the access to the VNC server of the image forming apparatus. Consequently, the service person at the call center can operate the operation screen of the image forming apparatus. However, the service person cannot operate the screen of the print control apparatus. If a print control apparatus is connected to an image forming apparatus, the user inputs various operations to the image forming apparatus from the print control apparatus. Therefore, if a service person at the call center cannot operate the operation screen of the print control apparatus, there may be cases in which he/she cannot solve an issue with the image forming apparatus.

SUMMARY OF THE INVENTION

An aspect of the present invention is to eliminate the above-mentioned problems with the conventional techniques.

A feature of the present invention is to provide a technique that allows an operator of a terminal device to check the operation screen of an information processing apparatus when performing remote maintenance on an image forming apparatus that is connected to the information processing apparatus, for example.

According to a first aspect of the present invention, there is provided a communication system in which a terminal device and an information processing apparatus are connected via a network, and an image forming apparatus is connected to the information processing apparatus, wherein the terminal device comprises: a first memory device that stores a set of instructions; and at least one processor that executes instructions out of the instructions to transmit a VNC connection request to the image forming apparatus via the network, as a VNC client, the information processing apparatus comprises: a second memory device that stores a set of instructions; and at least one processor that executes instructions out of the instructions to relay communication between the terminal device and the image forming apparatus, and transmit an operation screen for the information processing apparatus to the VNC client, and the image forming apparatus comprises: a third memory device that stores a set of instructions; and at least one processor that executes instructions out of the instructions to: upon receiving the VNC connection request via the information processing apparatus, transfer the VNC connection request to the information processing apparatus; and execute VNC communication with the terminal device via the information processing apparatus, and perform control to transfer the VNC communication to the information processing apparatus.

According to a second aspect of the present invention, there is provided a communication system in which a terminal device and an information processing apparatus are connected via a network, and an image forming apparatus is connected to the information processing apparatus, wherein the terminal device comprises: a first memory device that stores a set of instructions; and at least one processor that executes instructions out of the instructions to: select a transmission destination to which a VNC connection request is to be transmitted, as a VNC client; and receive and display, on a display unit, screen information that is displayed at the transmission destination thus selected, wherein the information processing apparatus comprises: a second memory device that stores a set of instructions; and at least one processor that executes instructions out of the instructions to relay communication between the terminal device and the image forming apparatus, and transmit an operation screen for the information processing apparatus to the VNC client upon receiving the VNC connection request, and the image forming apparatus comprises: a third memory device that stores a set of instructions; and at least one processor that executes instructions out of the instructions to: upon receiving the VNC connection request, perform VNC communication with the information processing apparatus; and perform control to perform VNC communication with the terminal device via the information processing apparatus.

According to a third aspect of the present invention, there is provided an information processing apparatus that is to be connected to a network via a first information processing apparatus, comprising: a VNC server; a memory device that stores a set of instructions; and at least one processor that executes instructions out of the instructions to: make an instruction to establish a connection between the VNC server and a server; and upon receiving a VNC connection request from a VNC client from the VNC server in a situation where a connection with the server has been established in response to the instruction, perform control to connect to the first information processing apparatus, as a VNC client.

According to a fourth aspect of the present invention, there is provided a print control apparatus that is to be connected between a network and an image forming apparatus, and relays communication between the network and the image forming apparatus, the print control apparatus comprising: a VNC server; a memory device that stores a set of instructions; and at least one processor that executes instructions out of the instructions to: upon being instructed by the image forming apparatus to establish a VNC connection, activate the VNC server and perform control to connect to the image forming apparatus, as a VNC client.

According to a fifth aspect of the present invention, there is provided a terminal device that is to be connected to, via a network, an information processing apparatus to which an image forming apparatus is connected, the terminal device comprising: a memory device that stores a set of instructions; and at least one processor that executes instructions out of the instructions to: select a transmission destination of a VNC connection request; transmit the VNC connection request to the transmission destination thus selected, and establish VNC communication as a VNC client; and receive, via the VNC communication, information of an operation screen displayed at the transmission destination thus selected, and display the information on a display unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8A is a diagram showing an example of information regarding image forming apparatuses stored in a database of the server computer according to the first embodiment.

FIG. 8B is a diagram showing an example of connection information regarding image forming apparatuses stored in the database of the server computer according to the first embodiment.

FIG. 29 depicts a view showing an example of a screen that is displayed on a web browser of the terminal device according to the sixth embodiment when a service person selects an image forming apparatus or a print control apparatus and presses a connection button on the screen shown in FIG. 28.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
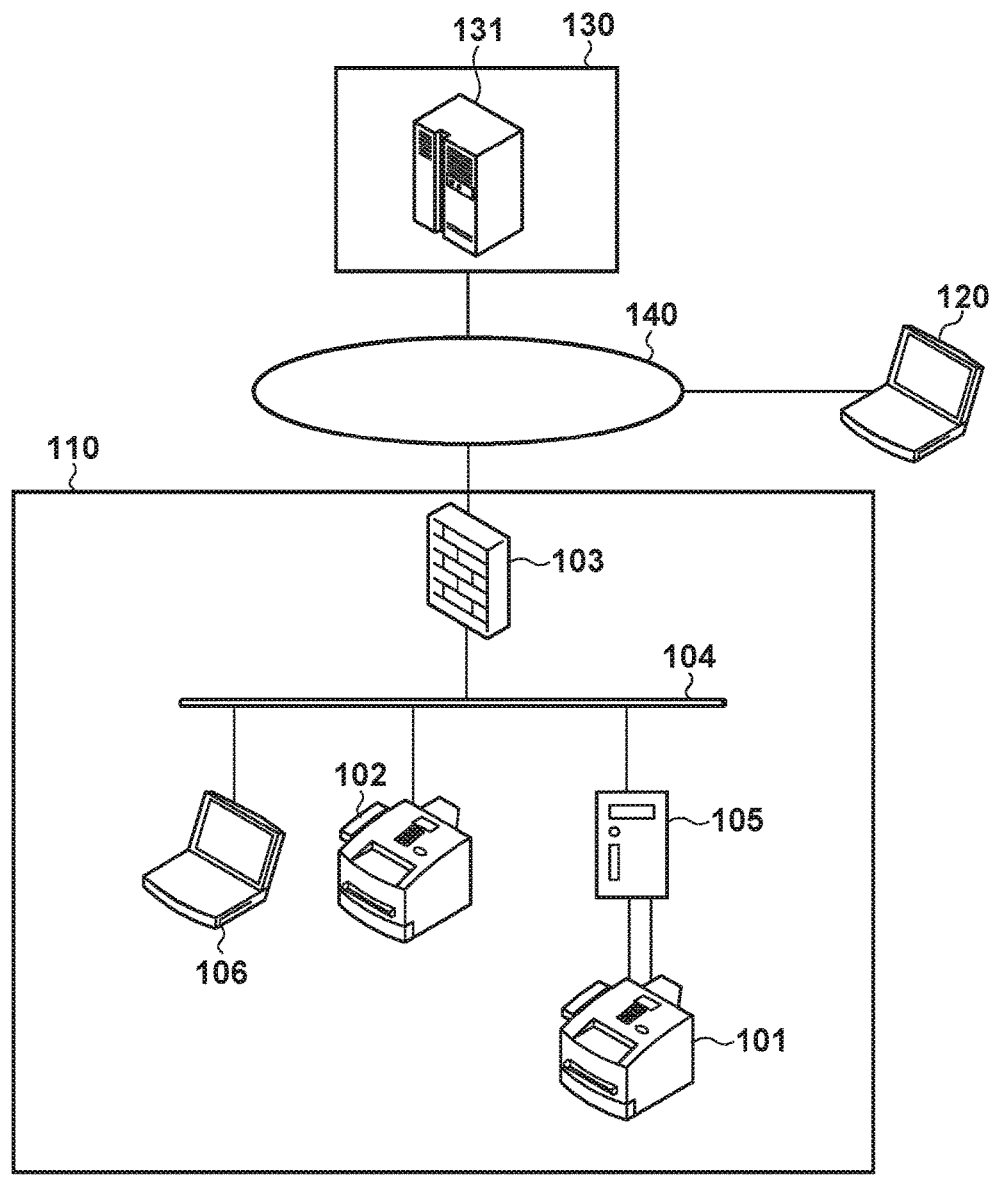
FIG. 1 is a diagram showing an example of a configuration of a communication system according to a first embodiment of the present invention.

FIG. 1 is a diagram showing an example of a configuration of a communication system according to a first embodiment of the present invention.

Image forming apparatuses 101 and 102, a print control apparatus 105, and an information processing apparatus 106 are located in a user environment 110, and are each able to access the Internet 140 via a network 104. Here, each of the image forming apparatuses 101 and 102 is a multi-function peripheral that has a scanning function, a printing function, a box function, and so on, and the configuration thereof will be described later with reference to FIG. 2. The information processing apparatus 106 is, for example, a personal computer or a mobile terminal. In this example, the print control apparatus 105 is connected to the image forming apparatus 101, and the print control apparatus 105 implements a network address translation (NAT) function. With this configuration, the image forming apparatus 101 can access the Internet 140 via the print control apparatus 105. The print control apparatus 105 relays the transmission from the image forming apparatus 101 to the Internet 140, and if there is a reply from the Internet 140, the print control apparatus 105 relays the reply to the image forming apparatus 101. Furthermore, if it is desired that the information processing apparatus 106 use a function provided by the image forming apparatus 101 (e.g. a web service), the information processing apparatus 106 transmits data to the print control apparatus 105. Upon receiving this data, the print control apparatus 105 relays and transmits the data to the image forming apparatus 101. Also, if the image forming apparatus 101 transmits reply data, the print control apparatus 105 relays the reply data to the information processing apparatus 106. Consequently, the image forming apparatus 101 connected to the network 104 via the print control apparatus 105 is also able to connect to the Internet 140 via the network 104, and is also able to use the functions of the image forming apparatus 101 from the information processing apparatus 106 in the user environment 110. Note that although not shown in the drawing, there may be a plurality of user environments 110, and there may be a greater number of image forming apparatuses and a greater number of print control apparatuses.

A firewall 103 is provided between the user environment 110 and the Internet 140. The firewall 103 permits a terminal located inside the user environment 110 to connect to the Internet 140, but prohibits connection from the Internet 140 to a terminal located inside the user environment 110.

A terminal device 120 is, for example, a smartphone, a mobile phone, a tablet, or a laptop or desktop PC located in a call center, and is able to access the Internet 140. A server computer group 130 is a server group including a server computer that provides services via the Internet 140, and there may be one or more server computers. FIG. 1 shows only one server computer, namely a server computer 131. In this configuration, as described later, it is possible to establish a connection between the terminal device 120 and the image forming apparatus 101 or 102, and to remotely operate the image forming apparatuses 101 and 102 from the terminal device 120.

Figure 2:
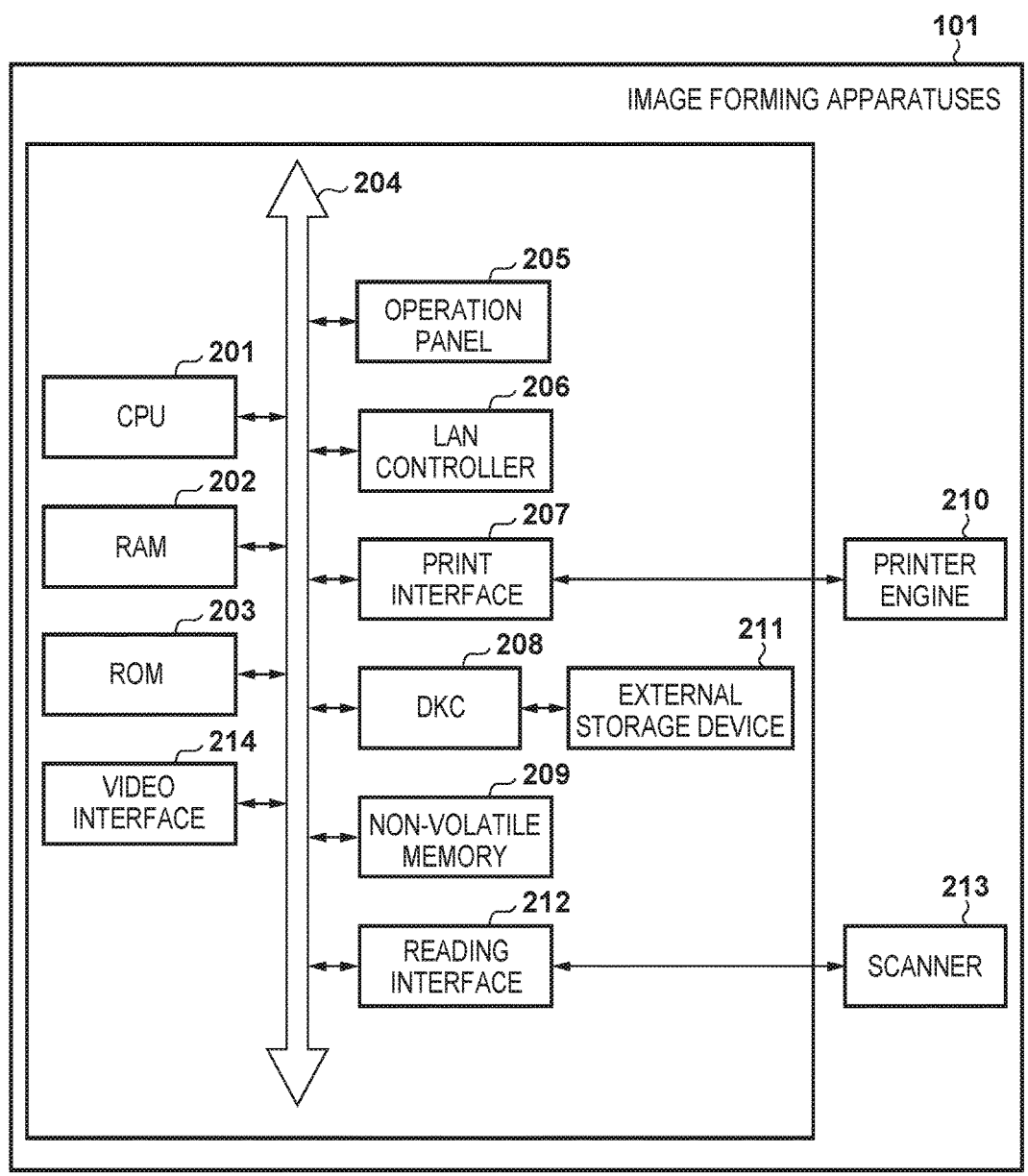
FIG. 2 is a block diagram for describing a hardware configuration of an image forming apparatus according to the first embodiment.

FIG. 2 is a block diagram for describing a hardware configuration of the image forming apparatus 101 according to the first embodiment.

A CPU 201 has control over operations of, and access by, units that are connected to a system bus 204, based on a control program that is stored in a ROM 203 or an external storage device 211. The CPU 201 also outputs an image signal to a printing unit (a printer engine) 210 that is connected via a print interface 207, and inputs an image signal from a reading unit (scanner) 213 that is connected via a reading interface 212. Also, the CPU 201 is able to perform communication processing to communicate with a terminal on the network 104 or another image forming apparatus via a LAN controller 206. A RAM 202 mainly provides a main memory, a work area, and so on for the CPU 201. The external storage device 211 such as a hard disk (HDD) or an IC card is controlled by a disk controller (DKC) 208. The DKC 208 performs control to store data that has been input via the system bus 204 in the external storage device 211, and to output data that is stored in the external storage device 211 to the system bus 204. The external storage device 211 is used to store an application program, font data, form data, and so on, and is also used as a job storage region for temporarily spooling a print job and externally controlling the spooled job. Furthermore, the external storage device 211 holds image data that has been input from the scanner 213 and image data of a print job, as box data, and the data thus held can be referenced by another device or the like via the network 104. In the first embodiment, it is assumed that an HDD is used as the external storage device 211, and stores various logs such as job logs and image logs. An operation panel 205 has a touch panel and a hard key, and a user can confirm a message and input various kinds of information by using the operation panel 205. A non-volatile memory 209 stores various kinds of setting information that has been set by using the operation panel 205, or by using a terminal or the like via the network 104. A video interface 214 is connected to the print control apparatus 105, and receives image data from the print control apparatus 105. Note that the configuration of the image forming apparatus 102 is the same as the configuration of the image forming apparatus 101 except that the image forming apparatus 102 does not have a component for connecting to the print control apparatus 105.

Figure 3:
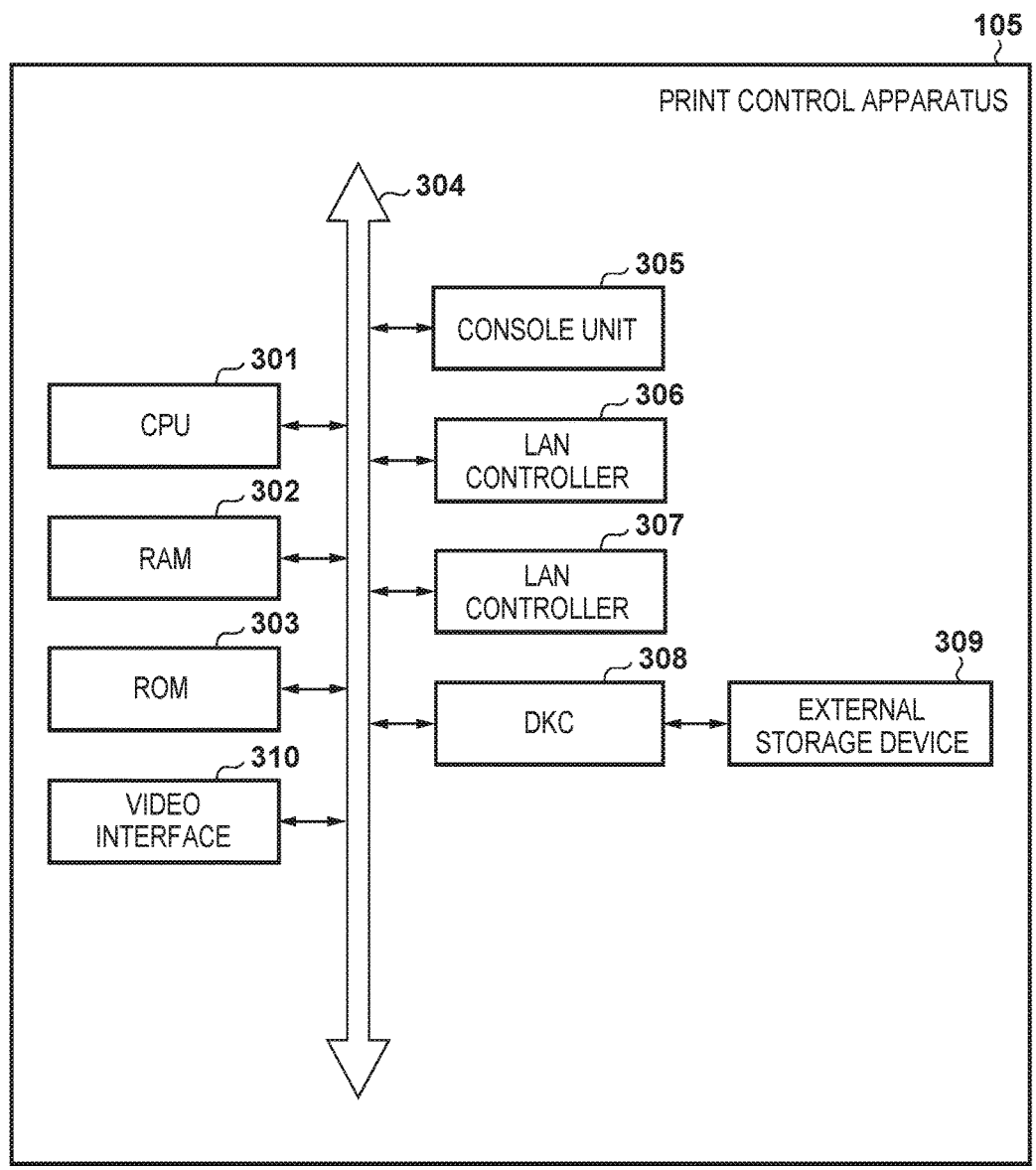
FIG. 3 is a block diagram for describing a hardware configuration of a print control apparatus according to the first embodiment.

FIG. 3 is a block diagram for describing a hardware configuration of the print control apparatus 105 according to the first embodiment.

A CPU 301 has control over operations of, and access by, units that are connected to a system bus 304, based on a control program that is stored in a ROM 303 or an external storage device 309. The CPU 301 is also able to communicate with the image forming apparatus 101 via a LAN controller 306. The CPU 301 is also able to perform communication processing to communicate with the information processing apparatus 106 and the image forming apparatus 102 in the network 104 via a LAN controller 307, and access the Internet 140. A RAM 302 mainly functions as a main memory, a work area, and so on for the CPU 301. Access to the external storage device 309 such as a hard disk (HDD) or an IC card is controlled by a disk controller (DKC) 308. The external storage device 309 stores an application program, font data, form data, and so on, and temporarily spools a print job. The CPU 301 applies raster image processor (RIP) processing to a job that is spooled in the external storage device 309, and stores image data that has been rasterized, in the external storage device 309. A user can input various kinds of information by using a soft key or a hardware key of a console unit 305. A video interface 310 is connected to the image forming apparatus 101, and is used to transmit image data that has undergone RIP processing to the image forming apparatus 101.

Figure 4:
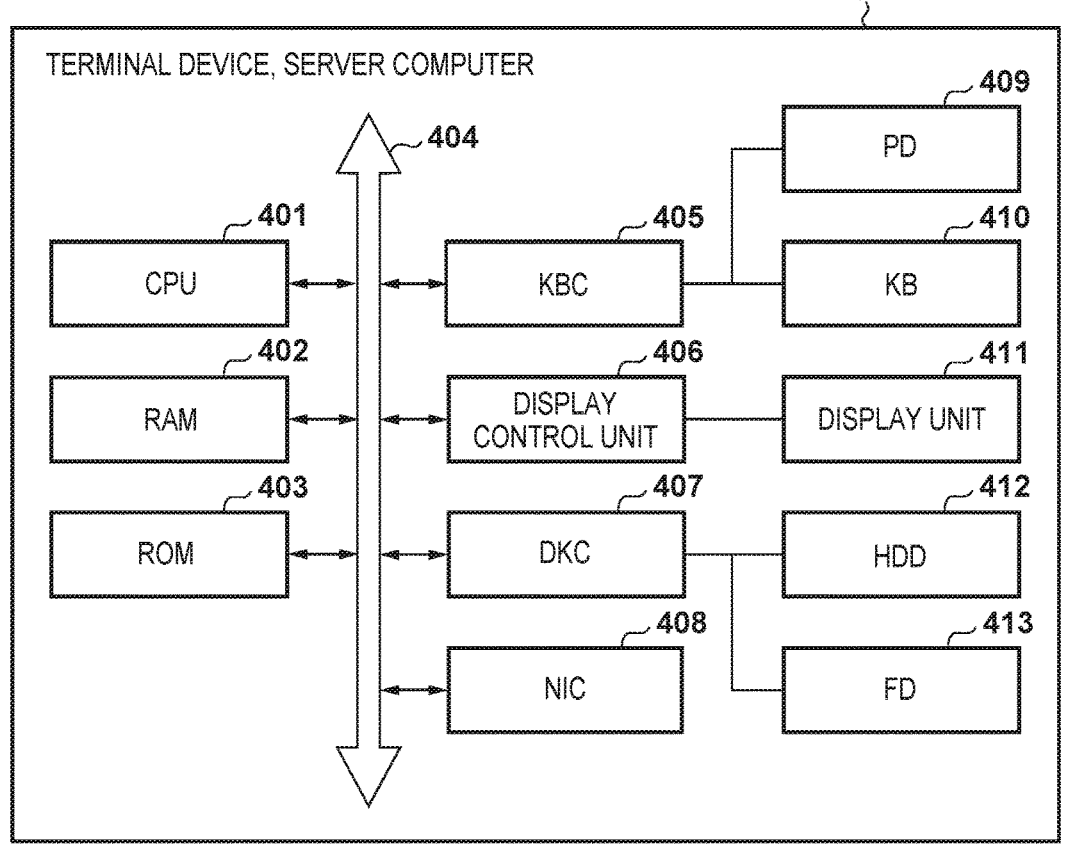
FIG. 4 is a block diagram for describing a hardware configuration of a terminal device and a server computer according to the first embodiment.

FIG. 4 is a block diagram for describing a hardware configuration of the terminal device 120 and the server computer 131 according to the first embodiment.

A CPU 401 controls various kinds of devices that are connected to a system bus 404. A ROM 402 stores a BIOS and a boot program. A RAM 403 is used as a main storage device for the CPU 401. A keyboard controller (KBC) 405 performs processing related to input of information or the like from a pointing device (PD) 409 and a keyboard (KB) 410. A display control unit 406 has a video memory therein. The display control unit 406 renders an image on the video memory according to an instruction form the CPU 401, and outputs and displays the image data thus rendered on the video memory to a display unit 411 as a video signal. A disc controller (DKC) 407 controls access to a hard disk (HDD) 412 and a Floppy™ disk (FD) 413. A network interface card (NIC) 408 connects to a network and communicates with other devices via a network. Note that the HDD 412 stores an OS, various kinds of application programs that run on the OS, and so on. If the device is turned on, the CPU 401 executes the boot program stored in the ROM 402 to read the OS and programs from the HDD 412, and deploys them to the RAM 403. Then, the CPU 401 executes the programs thus deployed to the RAM 403, and consequently the device becomes functional.

Figure 5:
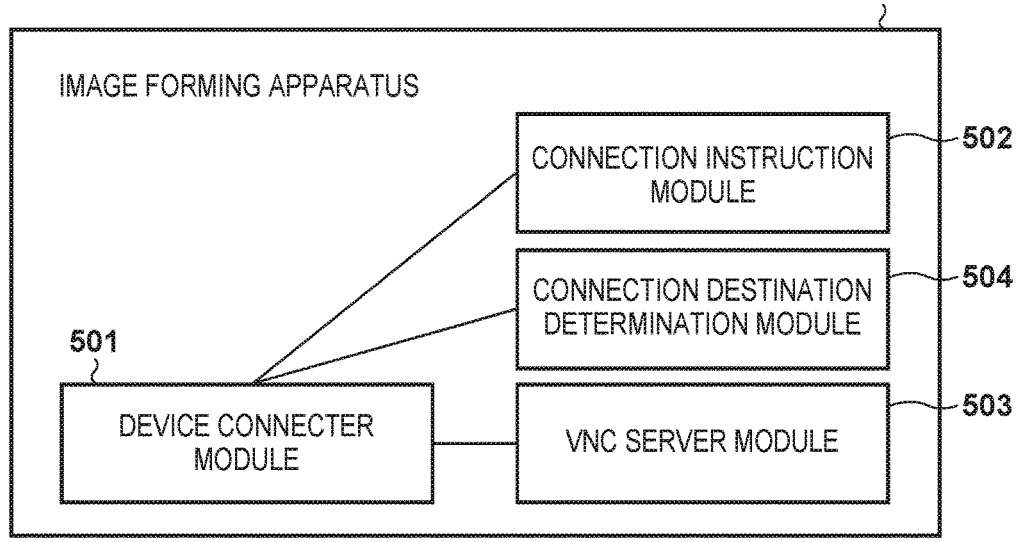
FIG. 5 is a block diagram for describing a software configuration of the image forming apparatus according to the first embodiment.

FIG. 5 is a block diagram for describing a software configuration of the image forming apparatus 101 according to the first embodiment. The programs of the processing modules shown in this block diagram are stored in the external storage device 211, and their functions are achieved by the CPU 201 deploying the programs to the RAM 202 and executing the programs.

Upon receiving an instruction from a connection instruction module 502, a device connecter module 501 establishes a connection with a server connecter module 701 (FIG. 7) of the server computer 131, which will be described later, and then mediates communication between the server connecter module 701 and a VNC server module 503. The connection instruction module 502 transmits a connection instruction to the device connecter module 501 upon a user performing an operation on the operation panel 205 such as pressing a button. The VNC server module 503 provides VNC server functions. Specifically, upon establishing a VNC connection in response to a request from a VNC client, the VNC server module 503 transmits, to the VNC client that is the connection destination, a screen that is the same as the screen displayed on the operation panel 205, according to an RFB (Remote Frame Buffer) protocol. For example, the user of the information processing apparatus 106 in the user environment can remotely operate an image forming apparatus by activating VNC client software using the information processing apparatus 106, and accessing the image forming apparatus.

Also, in the case of performing remote maintenance on, for example, the image forming apparatus 101 from the terminal device 120, a service person submits a VNC connection request from the terminal device 120 to the image forming apparatus 101 via the server computer 131. This VNC connection request is relayed by the device connecter module 501 and delivered to the VNC server module 503, and thus a VNC connection is established. Consequently, the service person can perform maintenance on the image forming apparatus 101 by operating the image forming apparatus 101 from the terminal device 120. In this case, the VNC server module 503 is subjected to VNC connection via the device connecter module 501, and therefore the IP address of the connection source seen from the VNC server module 503 is a local loopback address.

In the first embodiment, it is assumed that the VNC server module 503 can communicate with only one connection destination. In other words, during VNC communication with a given terminal device, if VNC connection with another terminal device is performed, VNC communication that has already been established is disconnected, and VNC connection with the newly connected terminal device is performed. Consequently, the possibility of a plurality of people remotely operating the operation screen at the same time is eliminated. Also, it is possible to prevent a situation in which a user who has connected to an image forming apparatus leaves his/her desk without disconnecting the VNC connection, and accordingly the connection is maintained despite the user not operating the operation screen.

However, when a VNC connection is used for connection from the terminal device 120 of the remote maintenance system to an image forming apparatus, the terminal device 120 needs to exclusively occupy the VNC connection. This is because, if the information processing apparatus 106 in the user environment, for example, establishes a VNC connection during maintenance work, there is the risk of a general user performing an operation that is only permitted to be performed by a service person, or seeing a screen that should not be seen by a general user, for example. Therefore, in the first embodiment, when a VNC connection from the terminal device 120 in the remote maintenance system to an image forming apparatus is to be established, an operation is performed such that only connection from the terminal device 120 is permitted. The details of processing performed by the VNC server module 503 will be described later. In the first embodiment, a description will be given assuming that communication is performed with only one connection destination, and an attempt to establish a connection that is made later is given priority. However, a connection may be established in another way. A connection destination determination module 504 determines the destination of VNC connection upon receiving a VNC connection request. Upon determining that the connection destination is the VNC server module 503 of the image forming apparatus, the connection destination determination module 504 outputs a connection instruction to the device connecter module 501. Also, upon determining that the connection destination is a VNC server module 1001 (FIG. 10) of the print control apparatus 105, which will be described later, the connection destination determination module 504 outputs an instruction indicating the result of determination to the device connecter module 501.

Figure 6:
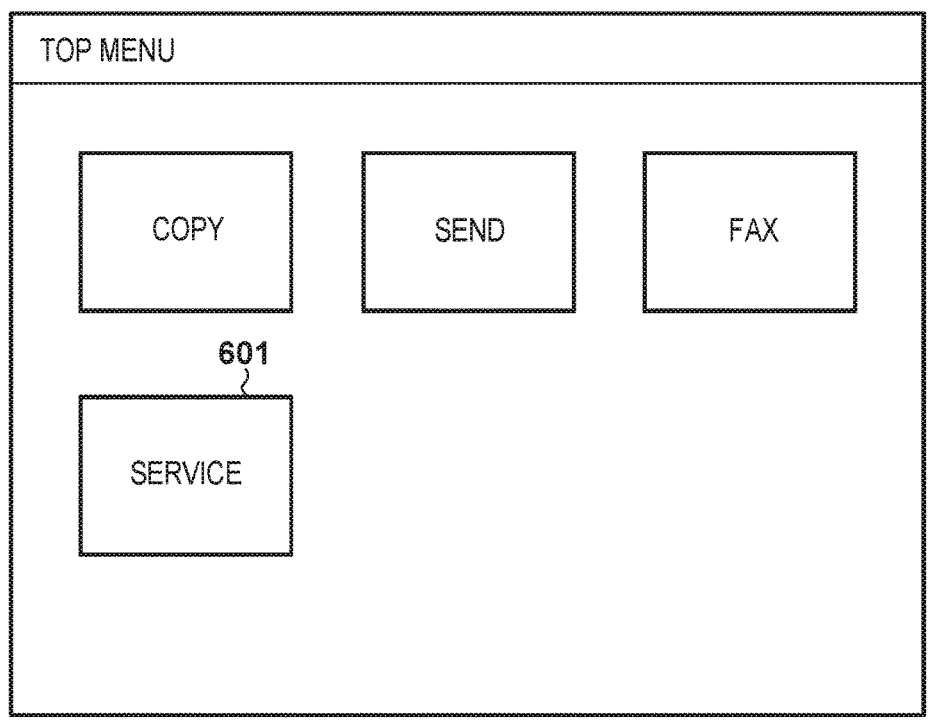
FIG. 6 depicts a view showing an example of an operation screen of the image forming apparatus according to the first embodiment in a case where a connection instruction module is realized by using a button on an operation panel.

FIG. 6 depicts a view showing an example of an operation screen of the image forming apparatus according to the first embodiment in a case where the connection instruction module 502 is realized by using a button on the operation panel 205.

A service button 601 is displayed on an operation screen of the operation panel 205, and a connection instruction is transmitted to the device connecter module 501 upon a user pressing the service button 601. This service button 601 is a button used by the user of the image forming apparatus in order to submit a request for remote maintenance of the image forming apparatus.

Figure 7:
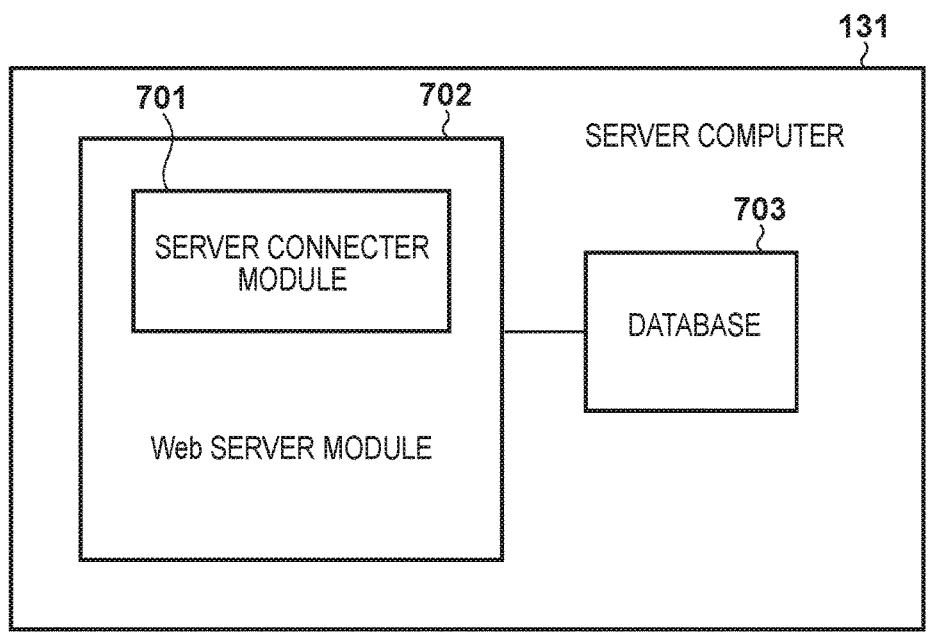
FIG. 7 is a block diagram for describing a software configuration of the server computer according to the first embodiment.

FIG. 7 is a block diagram for describing a software configuration of the server computer 131 according to the first embodiment. Note that the programs of the modules shown in this block diagram are stored in the HDD 412, and their functions are achieved by the CPU 401 deploying the programs to the RAM 403 and executing the programs.

Upon receiving a connection request from the device connecter module 501 of the image forming apparatus or a web browser 901 (FIG. 9) of the terminal device 120, the server connecter module 701 mediates communication with the device connecter module 501 or the web browser 901. A web server module 702 provides web server functions to the web browser 901 of the terminal device 120, and creates an initial screen that is to be displayed when a connection with the web browser 901 is established for the first time. Furthermore, the web server module 702 performs HTTP communication with the device connecter module 501 or the web browser 901, which is performed by the server connecter module 701. A database 703 stores static information such as information regarding image forming apparatuses and service people who are in charge of the services of the image forming apparatuses, and dynamic information such as the current connection status. In the first embodiment, a description will be given assuming that HTTP is employed as the communication protocol. However, another communication protocol such as HTTPS may be employed.

FIGS. 8A and 8B are diagrams showing examples of information regarding image forming apparatuses and connection information stored in the database 703 of the server computer 131 according to the first embodiment.

FIG. 8A shows example data of static information regarding image forming apparatuses. This data is updated when a contract to start or end support is made between a company that manufactures and sells an image forming apparatus, and a customer. A serial number 801 is a number that uniquely specifies an image forming apparatus. A model name 802 is the model name of an image forming apparatus. A customer name 803 is the name of a customer who is to be provided with support regarding an image forming apparatus, and one customer may own a plurality of image forming apparatuses. A service person name 804 is the name of a service person who is the main person in charge of supporting the image forming apparatus, and one service person may be in charge of a plurality of image forming apparatuses.

FIG. 8B shows example data of dynamic information regarding the state of connection with image forming apparatuses. As described below, the data of dynamic information is updated when the server connecter module 701 of the server computer 131 is connected to or disconnected from the device connecter module 501 of an image forming apparatus or the web browser 901 of the terminal device 120. Upon the server connecter module 701 receiving information regarding an image forming apparatus from the device connecter module 501, information regarding a serial number 811, a model name 812, and a customer name 813 of the image forming apparatus is specified and copied from data shown in FIG. 8A. A device connection date and time 814 is a date and time at which the device connecter module 501 of an image forming apparatus connects to the server connecter module 701. A service connection date and time 815 is a date and time at which the web browser 901 connects to the server connecter module 701. In other words, the service connection date and time 815 indicates the date at which a service person who operates the terminal device 120 connects to the image forming apparatus. A responding service person name 816 stores the name of a service person who operates the terminal device 120 if a connection has been established between the web browser 901 and the server connecter module 701. A connection ID 817 is identification data that is assigned when the image forming apparatus 101 or the print control apparatus 105 is connected, and is stored at the timing of establishment of the connection. A service person at the call center selects a device to which a connection is to be remotely established, based on the connection ID. Here, the image forming apparatus having a serial number "SN0004" is connected to the network 104 via the print control apparatus 105, and therefore "MFP3+DFE" is shown as its model name.

Figure 9:
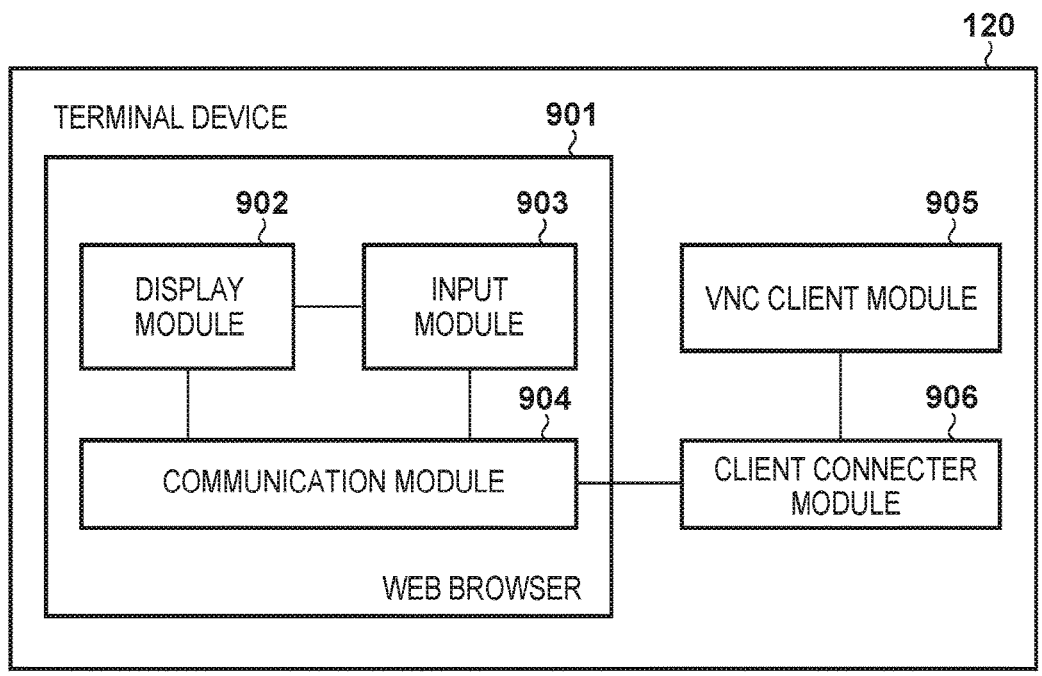
FIG. 9 is a block diagram for describing a software configuration of the terminal device according to the first embodiment.

FIG. 9 is a block diagram for describing a software configuration of the terminal device 120 according to the first embodiment. The programs of the modules shown in this block diagram are stored in the HDD 412, and their functions are achieved by the CPU 401 deploying the programs to the RAM 403 and executing the programs.

The web browser 901 is a typical web browser application, and includes a display module 902, an input module 903, and a communication module 904. Upon the input module 903 receiving an input from a user, the communication module 904 transmits the input to a Web server as an HTTP request. Upon receiving a response to the request, the display module 902 interprets and displays the response. In the first embodiment, an input from a user is transmitted to a web server as input information from a keyboard or a pointing device. A VNC client module 905 has a client function that is the function of communicating with a VNC server. A client connecter module 906 has the function of relaying so that the VNC client module 905 can perform VNC communication as HTTP communication from the communication module 904 via the web browser 901.

The following describes, as the first embodiment according to the first embodiment, processing by which the terminal device 120 and the print control apparatus 105 are enabled to perform VNC communication. In the flow of this processing, first, the terminal device 120 and the image forming apparatus 101 respectively establish HTTP communication with the server computer 131. Next, using this HTTP communication, the terminal device 120 connects to the image forming apparatus 101 via the server computer 131 according to the VNC protocol. Finally, the image forming apparatus 101 transfers the VNC communication to the print control apparatus 105. Communication between the terminal device 120 and the image forming apparatus 101 is communication using the VNC protocol via the HTTP protocol, and communication between the image forming apparatus 101 and the print control apparatus 105 is communication using the VNC protocol. The following describes the flow of this processing in detail.

Figure 10:
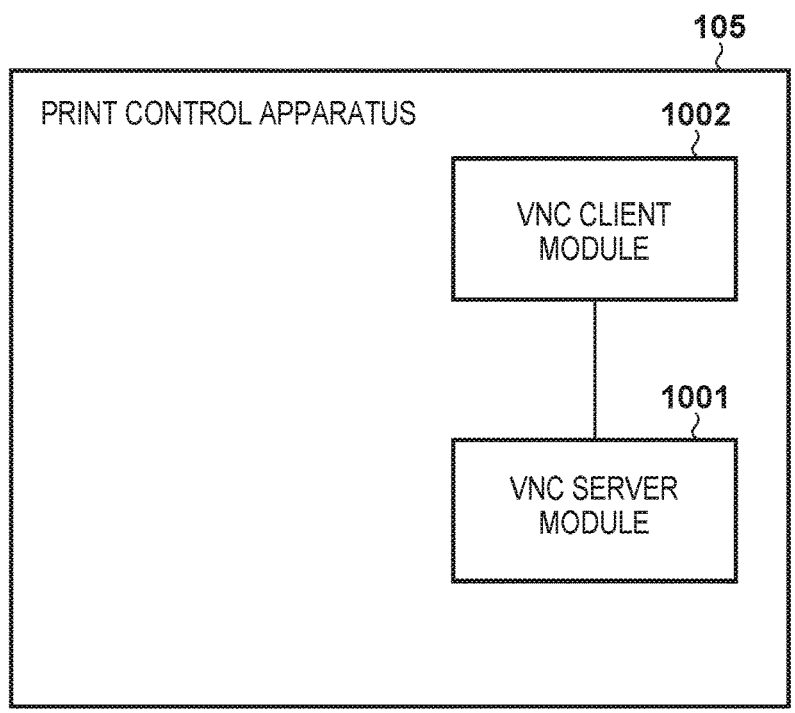
FIG. 10 is a block diagram for describing a software configuration of the print control apparatus according to the first embodiment.

FIG. 10 is a block diagram for describing a software configuration of the print control apparatus 105 according to the first embodiment. The programs of the modules shown in this block diagram are stored in the external storage device 309, and their functions are achieved by the CPU 301 deploying the programs to the RAM 302 and executing the programs.

The VNC server module 1001 provides VNC server functions. Specifically, upon establishing a connection in response to a request from a VNC client, the VNC server module 1001 transmits, to the VNC client that is the connection destination, a screen that is the same as the screen displayed on the console unit 305, according to the RFB protocol. For example, the user of the information processing apparatus 106 in the user environment can remotely operate the print control apparatus 105 by activating VNC client software using the information processing apparatus 106, and accessing the print control apparatus 105. A VNC client module 1002 has a client function that is the function of communicating with a VNC server.

Figure 11:
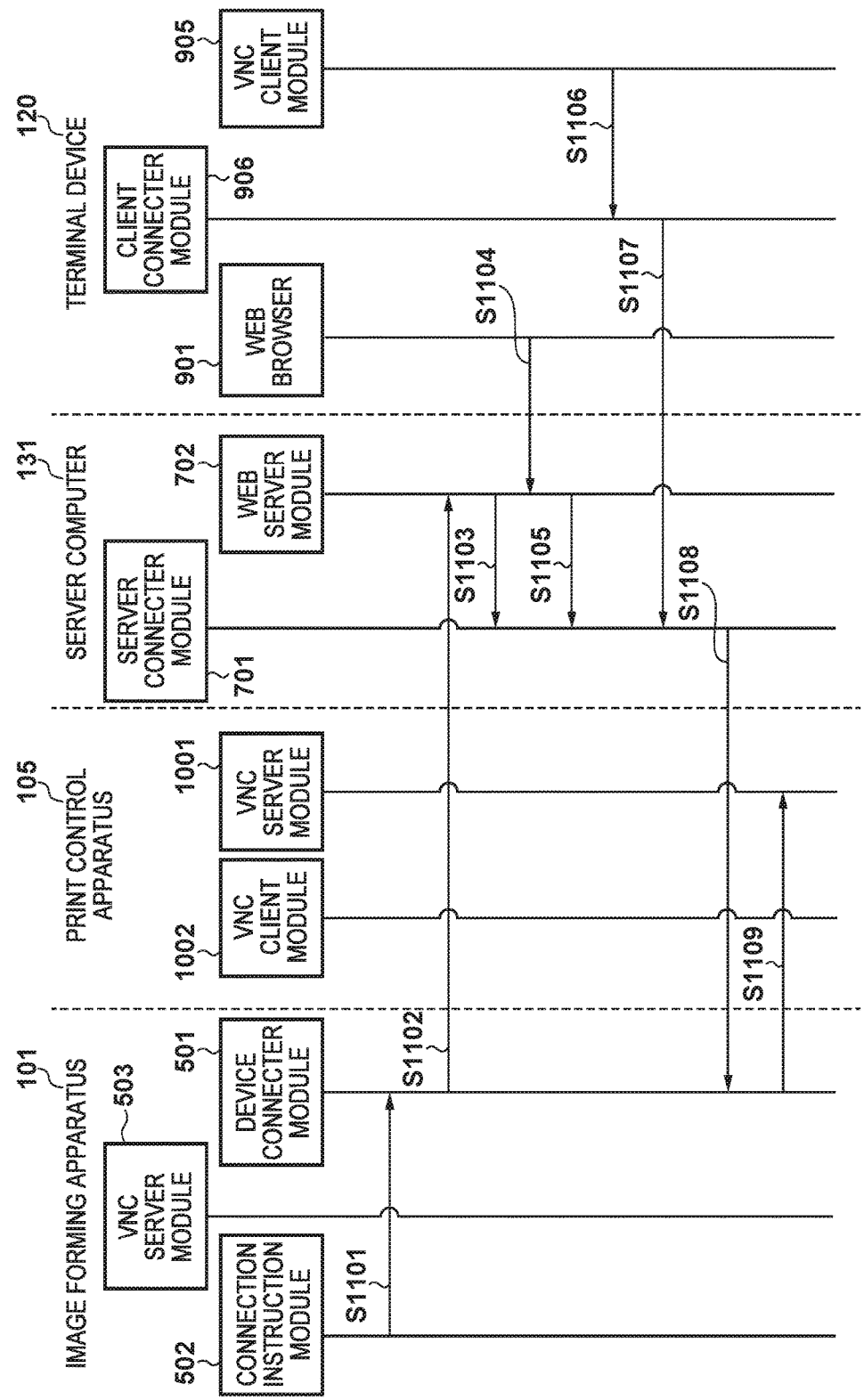
FIG. 11 is a sequence diagram for describing processing that is performed until a web browser of the terminal device according to the first embodiment and a VNC server module of the print control apparatus establish a connection.

FIG. 11 is a sequence diagram for describing processing that is performed until the web browser 901 of the terminal device 120 according to the first embodiment and the VNC server module 1001 of the print control apparatus 105 establish a connection. Here, processing performed by the image forming apparatus 101 is achieved by the CPU 201 deploying a program stored in the external storage device 211 to the RAM 202 and executing the program. Also, processing performed by the print control apparatus 105 is achieved by the CPU 301 deploying a program stored in the external storage device 309 to the RAM 302 and executing the program. Furthermore, processing performed by the server computer 131 and the terminal device 120 is achieved by the CPU 401 deploying programs stored in the HDD 412 to the RAM 403 and executing the programs.

First, in step S1101, upon a user pressing the service button 601 on the operation panel 205 of the image forming apparatus 101, the connection instruction module 502 transmits a connection instruction to the device connecter module 501. Next, in step S1102, the device connecter module 501 connects to the web server module 702 of the server computer 131, and transmits information such as the device name of the image forming apparatus 101. At this time, the print control apparatus 105 relays the connection request using the NAT function. Thereafter, when the image forming apparatus 101 and the web browser 901 of the terminal device 120 communicate with each other, the NAT function of the print control apparatus 105 relays the communication. At this time, upon detecting connection from the image forming apparatus 101, the web server module 702 of the server computer 131 issues a connection ID, and at the same time, registers the received information such as the device name in the database 703. Next, in step S1103, the web server module 702 notifies the server connecter module 701 of this connection and the connection ID. Thus, the server connecter module 701 manages connection from the image forming apparatus 101 based on the connection ID. Here, remote maintenance is realized by using the VNC protocol to share a screen between the VNC clients that are connected by using this connection ID. Furthermore, the server connecter module 701 manages a connected session for each connection ID. Thus, remote maintenance can be performed for each connection ID. In the first embodiment, a description will be given of a case in which two devices, namely the image forming apparatus 101 and the terminal device 120, are connected. However, three or more devices may be simultaneously connected. In another embodiment, instead of the web server module 702 issuing the connection ID, the server connecter module 701 may issue the connection ID at the time of acceptance, and the web server module 702 may receive the connection ID and register the connection ID in the database 703. Furthermore, the server connecter module 701 may register the connection ID in the database 703.

Next, the following describes a sequence in which, in response to connection from the image forming apparatus 101, the terminal device 120 according to the first embodiment establishes a connection via the server computer 131 by using the web browser 901.

In step S1104, the web browser 901 of the terminal device 120 connects to the web server module 702 of the server computer 131.

Figure 12:
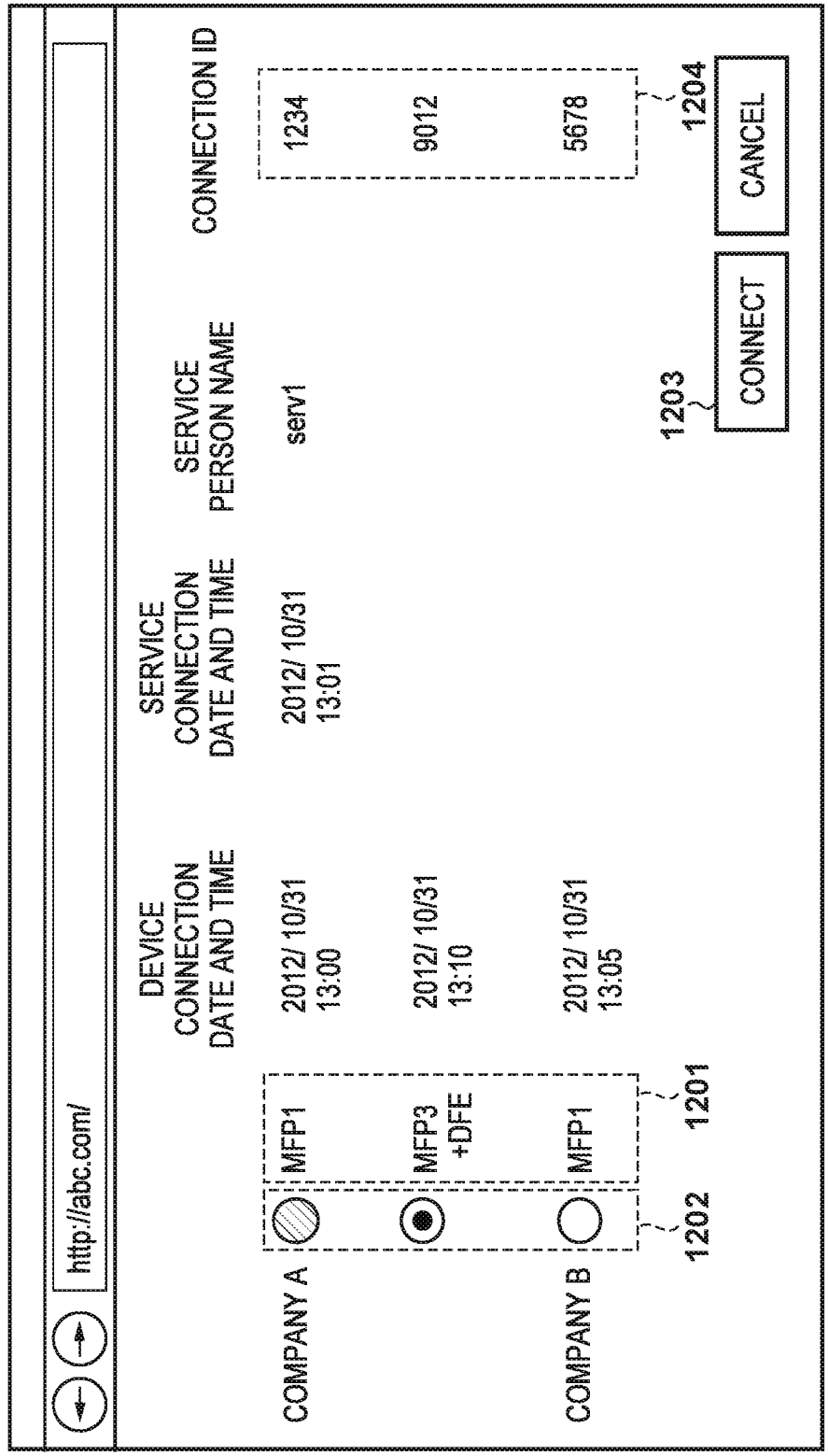
FIG. 12 depicts a view showing an example of a screen that is displayed on the web browser of the terminal device when step S1104 shown in FIG. 11 is performed.

FIG. 12 depicts a view showing an example of a screen that is displayed on the web browser 901 of the terminal device 120 when step S1104 shown in FIG. 11 is performed.

Upon the web browser 901 of the terminal device 120 connecting to the web server module 702 of the server computer 131, the web server module 702 obtains information registered in the database 703. Based on the information thus obtained, the web server module 702 creates a page to be displayed by the web browser 901, and transmits the page to the web browser 901. As described above with reference to FIGS. 8A and 8B, the serial numbers of image forming apparatuses and the names of customer companies are registered in the database 703, and a device name 1201 shows the model names 812 of the image forming apparatuses that are grouped by company name. "MFP" stands for multi-function peripheral, and indicates an image forming apparatus. The service person who is operating the terminal device 120 selects a check box 1202 corresponding to the name of the device to which the service person wishes to connect, and presses a connection button 1203 on this screen. Consequently, a connection request is transmitted to the VNC server. A reference numeral 1204 indicates the connection IDs respectively corresponding to the MFPs.

In this example, a plurality of image forming apparatuses connect to the web server module 702, and each image forming apparatus connects to the server connecter module 701 and awaits connection from the terminal device 120. Based on the connection IDs, the service person specifies the model that is to be subjected to remote maintenance, and selects the target image forming apparatus. Upon the service person selecting a desired MFP from the check boxes 1202 and pressing the connection button 1203, the web browser 901 transmits the connection ID corresponding to the model selected on this screen to the web server module 702. Note that, in FIG. 12, a service person "seryl" has already connected to an MFP1 of a company A, and since it is impossible to connect to the same image forming apparatus, the check box 1202 of the MFP1 of the company A is grayed out. Upon the service person checking the check box 1202 of the image forming apparatus 101 (MFP3+DFE) as shown in FIG. 12 and pressing the connection button 1203, the web browser 901 transmits, to the web server module 702, a connection request with respect to the image forming apparatus 101 whose connection ID is "9012". Here, the image forming apparatus 101 is connected to the network 104 via the print control apparatus 105, and therefore "MFP3+DFE" is shown as its model name, as described above.

See FIG. 11 again. Upon receiving the connection request, the web server module 702, in step S1105, submits a connection request to the server connecter module 701 based on the connection ID. Consequently, in step S1108, the server connecter module 701 and the device connecter module 501 of the image forming apparatus 101 establish a connection. In other words, the server connecter module 701 serves as a server, establishes connections with a plurality of clients, and relays data transmitted from one client, to another client.

Next, a description will be given of the mechanism in which the device connecter module 501 of the image forming apparatus 101 transmits data to the web browser 901 of the terminal device 120.

The server connecter module 701 of the server computer 131 waits for data to be transmitted from the device connecter module 501 of the image forming apparatus 101. When transmitting data to the server connecter module 701, the device connecter module 501 uses the POST method according to the HTTP. Next, the server connecter module 701 transmits the received data to the web browser 901 of the terminal device 120. In this case, the server connecter module 701 transmits the data in response to the GET method according to the HTTP, which has already been transmitted by the terminal device 120. Consequently, data can be transmitted from the device connecter module 501 to the web browser 901 of the terminal device 120 via the server connecter module 701 of the server computer 131.

Upon the server connecter module 701 and the device connecter module 501 of the image forming apparatus 101 establishing a connection in step S1105, the VNC client module 905 of the terminal device 120 transmits a VNC connection request in step S1106. At this time, the VNC client module 905 is activated by the service person who is using the terminal device 120 performing an operation to submit a VNC connection request from the screen of the web browser 901, and the VNC client module 905 transmits the VNC connection request. The client connecter module 906 of the terminal device 120 is activated together with the VNC client module 905 when the service person performs the VNC connection operation from the screen of the web browser 901. Upon detecting that a connection request to the VNC server has been submitted, the VNC client module 905, in step S1106, transmits this connection request to the client connecter module 906. Here, the protocol according to which the VNC client module 905 transmits the request is the VNC protocol. Upon receiving this request, the client connecter module 906, in step S1107, transmits a connection request to the server connecter module 701 of the server computer 131. This connection request follows the HTTP protocol, and therefore the client connecter module 906 modifies the connection request as appropriate such that communication can be performed using the VNC protocol via the HTTP protocol, and transmits the modified connection request. Thus, the server connecter module 701 of the server computer 131, in step S1108, transmits the connection request to the device connecter module 501 of the image forming apparatus 101. Consequently, the device connecter module 501 determines whether or not a VNC connection request exits in the received HTTP data. If a VNC connection request exits, the device connecter module 501 performs VNC connection processing, which will be described later.

Figure 13:
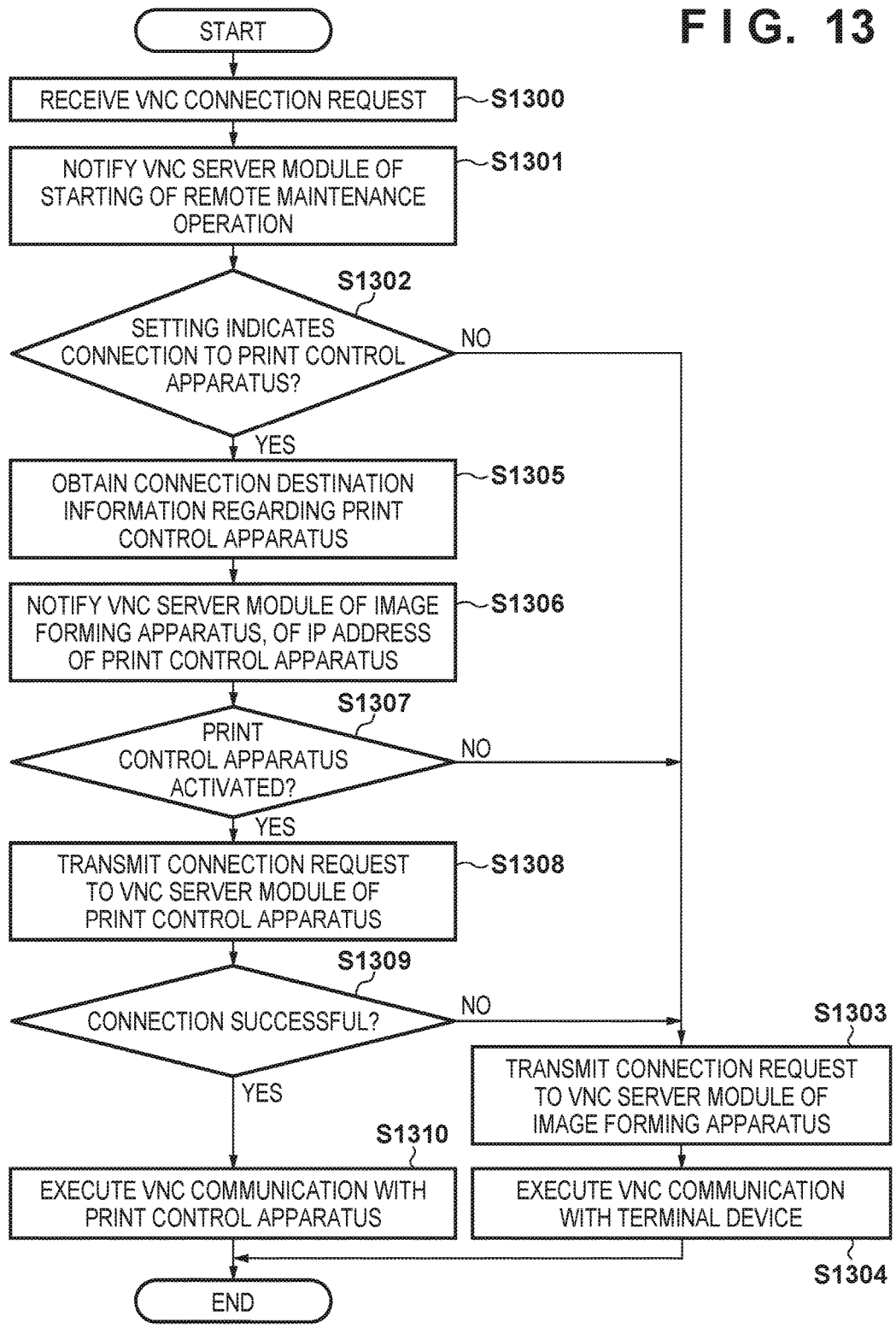
FIG. 13 is a flowchart for describing processing that is performed when a device connecter module of the image forming apparatus according to the first embodiment receives a connection request for connection to a VNC server.

FIG. 13 is a flowchart for describing processing that is performed when the device connecter module 501 of the image forming apparatus 101 according to the first embodiment receives a connection request for connection to a VNC server. A program that realizes the processing shown by this flowchart is stored in the external storage device 211, and the processing is achieved by the CPU 201 deploying the program to the RAM 202 and executing the program so that the CPU 201 realizes the functions of the modules shown in FIG. 5. Therefore, in the following description, it is assumed that the processing is executed by the modules shown in FIG. 5.

First, in step S1300, the device connecter module 501 receives the VNC connection request transmitted from the server computer 131 in step S1108 shown in FIG. 11, and proceeds to step S1301. In step S1301, the device connecter module 501 notifies the VNC server module 503 of the fact that a remote maintenance operation, i.e. a maintenance operation from the terminal device 120, has been started. Upon being notified, the VNC server module 503 enters a mode for limiting connection sources from which VNC connection is permitted. Specifically, the VNC server module 503 enters a mode in which connection from only connection sources whose IP address is a loopback address is permitted. Then, the processing proceeds to step S1302, and the device connecter module 501 determines whether or not the image forming apparatus 101 has been set so as to connect to the print control apparatus 105 at this point in time. If the image forming apparatus 101 has not been set so as to connect to the print control apparatus 105, the processing proceeds to step S1303, the device connecter module 501 transmits a connection request to the VNC server module 503 of the image forming apparatus 101, and the processing proceeds to step S1304. In step S1304, the VNC server module 503 executes VNC communication with the web browser 901 of the terminal device 120. In this case, the VNC server module 503 of the image forming apparatus 101 establishes a VNC connection via the device connecter module 501, and therefore the IP address of the connection source is a loopback address. Therefore, even if the VNC server module 503 in step S1301 is in the mode for accepting connection from only connection sources whose IP address is a loopback address, the VNC server module 503 can accept the connection request from the device connecter module 501. Thereafter, if a VNC connection request is made from the information processing apparatus 106 in the user environment, the connection request is not accepted because the IP address of the connection source is the IP address of the information processing apparatus 106. Therefore, during remote maintenance performed by the service person operating the terminal device 120, it is possible to prevent a VNC connection with another terminal device from being established.

On the other hand, if it is determined in step S1302 that the image forming apparatus 101 has been set so as to connect to the print control apparatus 105, the processing proceeds to step S1305. In step S1305, the device connecter module 501 obtains the connection destination information of the print control apparatus 105, and the processing proceeds to step S1306. In step S1306, the device connecter module 501 notifies the VNC server module 503 of the IP address of the print control apparatus 105. Upon being notified, the VNC server module 503 is set so as to accept VNC connection from the IP address of the print control apparatus 105 in addition to a VNC connection request from a local loopback address, and the processing proceeds to step S1307. In step S1307, the device connecter module 501 determines whether or not the print control apparatus 105 has been properly activated. Here, if it is determined that the print control apparatus 105 has not been properly activated, the processing proceeds to step S1303, and the above-described processing is executed. On the other hand, if it is determined in step S1307 that the print control apparatus 105 has been properly activated, the processing proceeds to step S1308. Note that the determination in step S1307 regarding whether or not the print control apparatus 105 has been properly activated is made based on whether or not network communication is available and RIP processing and print job transmission processing are already available.

In step S1308, the device connecter module 501 transmits a connection request to the VNC server module 1001 of the print control apparatus 105, and the processing proceeds to step S1309. This is the processing performed in step S1109 shown in FIG. 11. In step S1309, the device connecter module 501 determines whether or not a connection with the VNC server module 1001 of the print control apparatus 105 has been successfully established. Here, if a connection has not been successfully established, retry processing is performed several times. Nevertheless, if a connection cannot be established, the processing proceeds to step S1303. On the other hand, if it is determined in step S1309 that a connection with the VNC server module 1001 of the print control apparatus 105 has been successfully established, the processing proceeds to step S1310, and the VNC server module 503 performs VNC communication with the VNC server module 1001 of the print control apparatus 105.

Thus, a connection between the web browser 901 of the terminal device 120 and the VNC server module 1001 of the print control apparatus 105 is established, and thereafter VNC communication can be performed between the web browser 901 and the print control apparatus 105. Note that the VNC server module 1001 may activate the VNC client module 1002 and submit a connection request to the VNC server module 503 of the image forming apparatus 101 upon being triggered by the starting of VNC communication. If this is the case, since the VNC server module 503 of the image forming apparatus 101 has been set so as to accept a VNC connection from the IP address of the print control apparatus 105 in step S1306, the VNC server module 503 accepts the connection request from the VNC client module 1002 of the print control apparatus 105.

In the first embodiment, the VNC server module 503 of the image forming apparatus 101 that has notified of the fact that remote maintenance has been started determines whether or not to permit VNC connection thereafter, based on the IP address of the connection source that has made a VNC connection request. However, determination may be performed by using another method. For example, the VNC server module 503 may request a password upon receiving a VNC connection request, and permits the VNC connection if a special password for maintenance is input.

As described above, according to the first embodiment, if a VNC connection to an image forming apparatus that is connected to a network via a print control apparatus is requested from a terminal device in a call center, a VNC connection request is transmitted to the print control apparatus. Consequently, a VNC connection is established between the terminal device and the print control apparatus. If the print control apparatus has not been activated, a direct VNC connection is established between the terminal device in the call center and the image forming apparatus.

Second Embodiment

Next, a second embodiment of the present invention will be described. In the second embodiment, a description will be given of processing in which the terminal device 120 and the print control apparatus 105 are enabled to perform VNC communication, and the print control apparatus 105 and the image forming apparatus 101 are also enabled to perform VNC communication using the aforementioned VNC communication. Consequently, the terminal device 120 is enabled to display and operate an operation screen for remote maintenance of the print control apparatus 105, and the terminal device 120 is also enabled to display and operate an operation screen for remote maintenance of the image forming apparatus 101 on the aforementioned operation screen. Note that the hardware configurations, etc. of the image forming apparatus 101, the terminal device 120, the print control apparatus 105, and the server computer 131 according to the second embodiment are the same as those in the first embodiment, and therefore the descriptions thereof are omitted.

Figure 14:
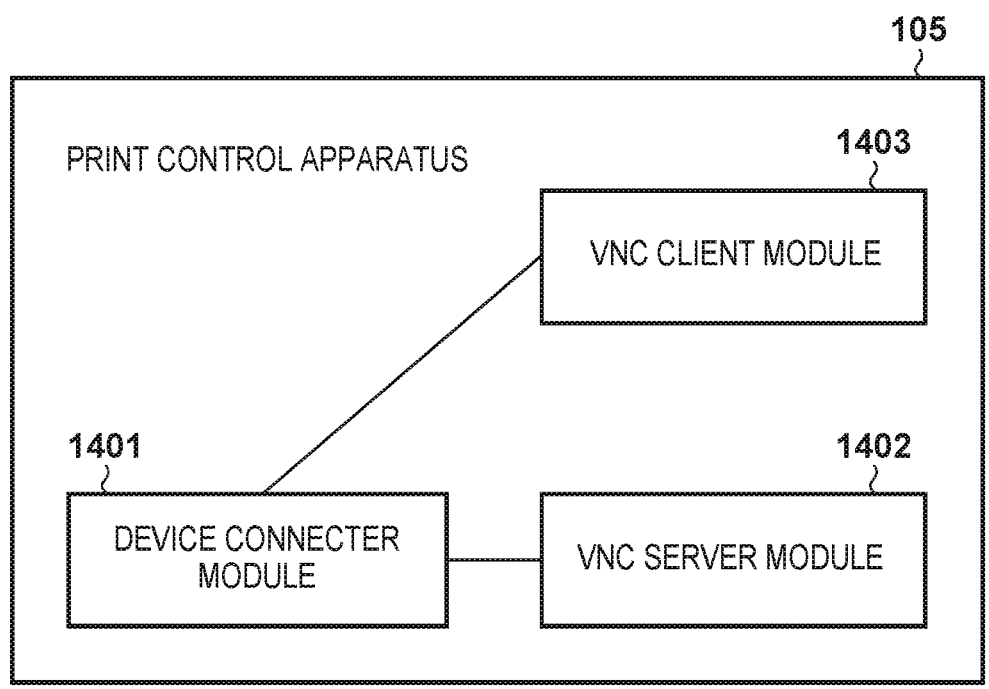
FIG. 14 is a block diagram for describing a software configuration of a print control apparatus according to a second embodiment of the present invention.

FIG. 14 is a block diagram for describing a software configuration of the print control apparatus 105 according to the second embodiment of the present invention. The programs of the modules shown in this block diagram are stored in the external storage device 309, and their functions are achieved by the CPU 301 deploying the programs to the RAM 302 and executing the programs.

Upon receiving a VNC connection instruction from the device connecter module 501 of the image forming apparatus 101, a device connecter module 1401 of the print control apparatus 105 mediates communication between the device connecter module 501 and a VNC server module 1402 of the print control apparatus 105. The device connecter module 501 of the image forming apparatus 101 mediates connection between the server connecter module 701 of the server computer 131 and the device connecter module 1401 of the print control apparatus 105. The VNC server module 1402 provides VNC server functions. Upon receiving a new VNC connection request via the device connecter module 1401, the VNC server module 1402 accepts the VNC connection request, and transmits screen information according to the VNC protocol. Upon being connected to the device connecter module 501 of the image forming apparatus 101, the device connecter module 1401 activates a VNC client module 1403. The VNC client module 1403 communicates with the VNC server module 503 of the image forming apparatus 101.

Figure 15:
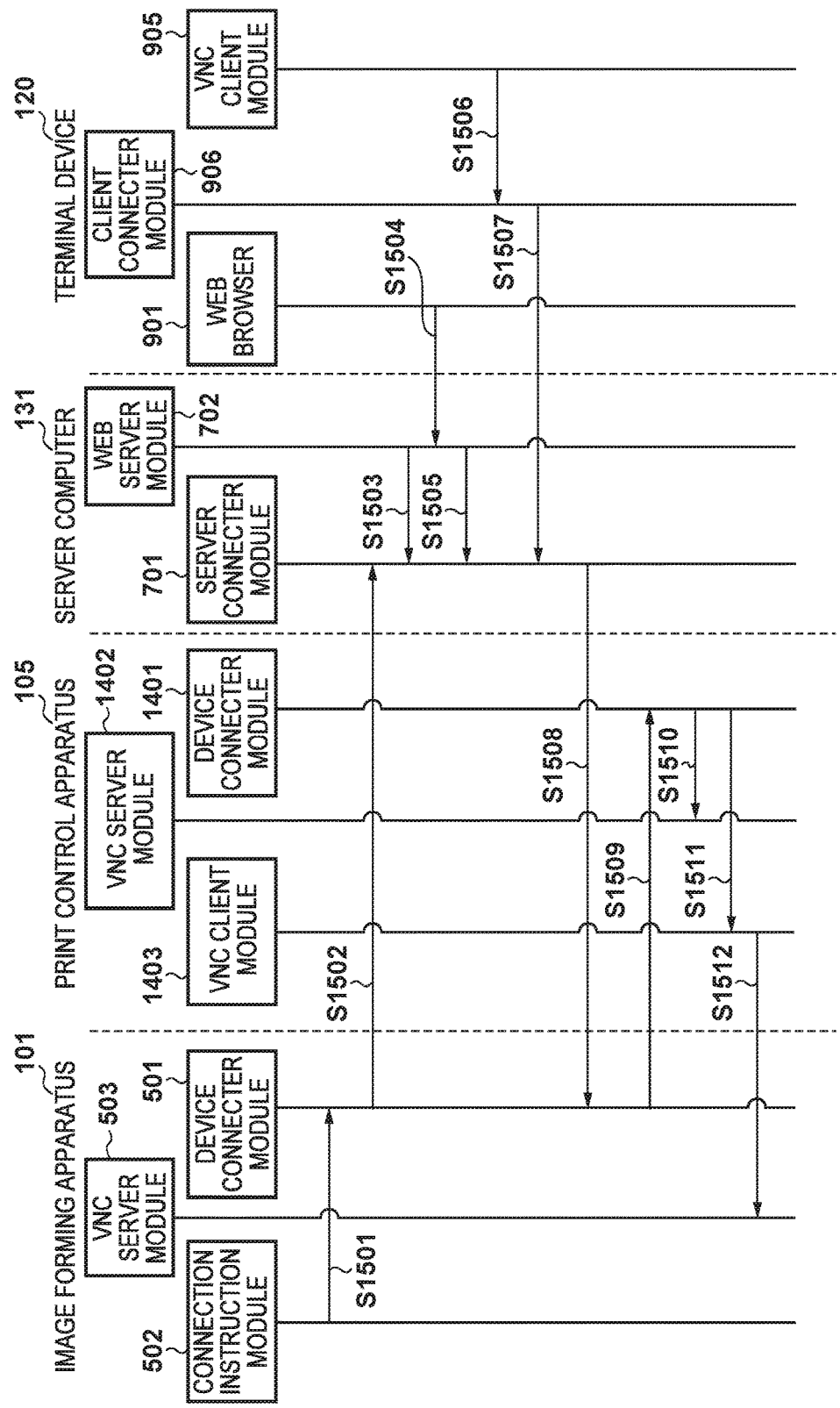
FIG. 15 is a sequence diagram for describing processing that is performed until a web browser of a terminal device according to the second embodiment and a VNC server module of the print control apparatus establish a connection.

FIG. 15 is a sequence diagram for describing processing that is performed until the web browser 901 of the terminal device 120 according to the second embodiment and the VNC server module 1403 of the print control apparatus 105 establish a connection. Here, processing performed by the image forming apparatus 101 is achieved by the CPU 201 deploying a program stored in the external storage device 211 to the RAM 202 and executing the program. Also, processing performed by the print control apparatus 105 is achieved by the CPU 301 deploying a program stored in the external storage device 309 to the RAM 302 and executing the program. Furthermore, processing performed by the server computer 131 and the terminal device 120 is achieved by the CPU 401 deploying programs stored in the HDD 412 to the RAM 403 and executing the programs. Steps S1501 to S1508 are the same as steps S1101 to S1108 in FIG. 11 that have been described in the first embodiment, and therefore the descriptions thereof are omitted.

Also, regarding the processing performed when the device connecter module 501 of the image forming apparatus 101 according to the first embodiment receives a connection request for connection to a VNC server, the connection request is submitted to the VNC server module 1001 of the print control apparatus 105 in step S1308 shown in FIG. 13. However, in the second embodiment, the connection request is simply submitted to the device connecter module 1401 of the print control apparatus 105. Therefore, the description of this processing is also omitted.

In step S1509, the device connecter module 501 of the image forming apparatus 101 submits a connection request to the device connecter module 1401 of the print control apparatus 105.

Figure 16:
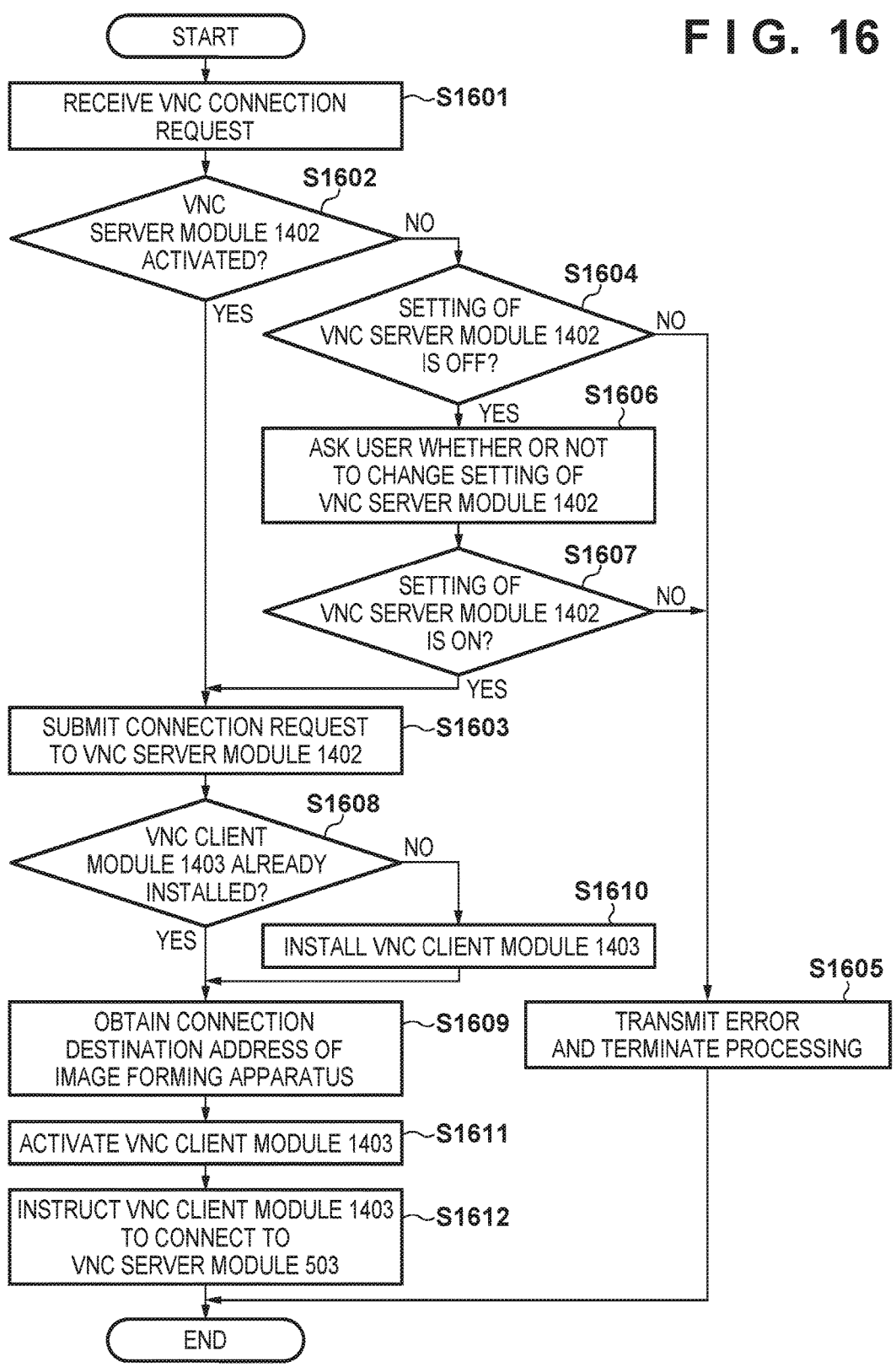
FIG. 16 is a flowchart for describing processing that is performed when a device connecter module of the print control apparatus according to the second embodiment receives a connection request submitted in step S1509.

FIG. 16 is a flowchart for describing processing that is performed when the device connecter module 1401 of the print control apparatus 105 according to the second embodiment receives a connection request submitted in step S1509. Note that the program executing this processing is stored in the external storage device 309, and this processing is achieved by the CPU 301 deploying the program to the RAM 302 and executing the program. Therefore, in the following description, it is assumed that the processing is executed by the modules shown in FIG. 14.

Upon receiving a VNC connection request in step S1601, the processing proceeds to step S1602. In step S1602, the device connecter module 1401 determines whether or not the VNC server module 1402 of the print control apparatus 105 has already been activated. If it is determined that the VNC server module 1402 has already been activated, the processing proceeds to step S1603, and if it is determined that the VNC server module 1402 has not been activated, the processing proceeds to step S1604. In step S1604, the device connecter module 1401 determines the setting of the server module 1402. Regarding the setting value, it is possible to provide a setting mode that prompts the user to input a setting as a user interface (not shown), and allows the user to switch the setting to ON and OFF on the user interface. Furthermore, it is possible to switch the setting to ON upon the device connecter module 1401 receiving a VNC connection request, and to switch the setting to OFF upon completion of the VNC connection request. If this is the case, the device connecter module 1401 may automatically switch the setting value to ON after determining that the setting is OFF, and the processing proceed to step S1603. In step S1604, if it is determined that the setting of the VNC server module 1402 is ON, the processing proceeds to step S1605. If this is the case, in step S1605, the fact that the VNC server module 1402 cannot be activated due to a certain error is notified to the device connecter module 501 of the image forming apparatus 101, and the processing is complete.

On the other hand, if it is determined in step S1604 that the setting of the VNC server module 1402 is OFF, the processing proceeds to step S1606 and the device connecter module 1401 asks the user whether or not to change the setting. In step S1606, the device connecter module 1401 displays a popup screen (not shown) on the user interface, and asks the user whether or not to switch the setting of the VNC server module 1402 to ON. In step S1606, upon the user confirming that the setting is to be switched to ON, the processing proceeds to step S1607, and the device connecter module 1401 determines the setting value that has been set by the user from the screen. Here, if the setting of the VNC server module 1402 is still OFF, the processing proceeds to step S1605, and the device connecter module 1401 transmits an error indicating that the VNC server module 1402 cannot be activated due to the user's intention, and terminates this processing.

In step S1607, if it is determined that the setting of the VNC server module 1402 has been changed to ON, the device connecter module 1401 activates the VNC server module 1402 and the processing proceeds to step S1603. In step S1603, the device connecter module 1401 submits a connection request to the VNC server module 1402 (step S1510 in FIG. 15). Thus, a connection between the web browser 901 of the terminal device 120 and the VNC server module 1402 of the print control apparatus 105 is established, and thereafter VNC communication can be performed between them.

Next, the processing proceeds to step S1608, and the device connecter module 1401 determines whether or not the VNC client module 1403 exists. In other words, the device connecter module 1401 determines whether or not the VNC client module 1403 has already been installed in the print control apparatus 105. Here, if it is determined that the VNC client module 1403 has already been installed, the processing proceeds to step S1609, and otherwise the processing proceeds to step S1610. In step S1610, the device connecter module 1401 installs the VNC client module 1403, and the processing proceeds to step S1609. Here, the software of the VNC client module 1403 may be stored in the external storage device 309 of the print control apparatus 105 in advance, or obtained from the server computer 131 or the image forming apparatus 101.

In step S1609, the device connecter module 1401 obtains the network address of the image forming apparatus 101 that is the connection destination (the connection destination address), and the processing proceeds to step S1611. This network address may be stored in the external storage device 309 of the print control apparatus 105, or obtained based on the connection request submitted in step S1509 shown in FIG. 15. In step S1609, upon obtaining the connection destination address, the processing proceeds to step S1611 and the device connecter module 1401 activates the VNC client module 1403. As a result of the VNC client module 1403 being activated, the VNC client module 1403 becomes available. Then, the processing proceeds to step S1612, and the device connecter module 1401 requests the VNC client module 1403 to connect to the VNC server module 503 of the image forming apparatus 101 based on the network address of the image forming apparatus 101 obtained in step S1609. This processing corresponds to step S1511 shown in FIG. 15. Consequently, the VNC client module 1403 of the print control apparatus 105 transmits a connection request to the VNC server module 503 of the image forming apparatus 101 by using the VNC protocol (step S1512 in FIG. 15).

Consequently, communication between the VNC client module 1403 and the VNC server module 503 is established by using VNC communication via a connection established between the web browser 901 of the terminal device 120 and the VNC server module 1402 of the print control apparatus 105, and thus VNC communication becomes available between the VNC client module 1403 and the VNC server module 503 as well. Thus, the web browser 901 of the terminal device 120 can execute VNC communication established between the print control apparatus 105 and the terminal device 120 in step S1510, and can also execute VNC communication between the print control apparatus 105 and the image forming apparatus 101.

As described above, according to the second embodiment, the terminal device can display and operate the operation screen for remote maintenance of the print control apparatus on the display module of the terminal device. Furthermore, it is possible to display and operate the operation screen for remote maintenance of the image forming apparatus on the aforementioned operation screen. Also, if the VNC server of the print control apparatus has not been activated at this time, it is possible to make an instruction to activate the VNC server, and establish a VNC connection upon the VNC server being activated. It is also possible to allow the user to input a setting as to whether or not to activate the VNC server. Furthermore, if the VNC client has not been installed in the print control apparatus, it is possible to automatically install and activate the VNC client in response to a VNC connection request.

Third Embodiment

Next, a third embodiment of the present invention will be described. In the third embodiment, it is assumed that the image forming apparatus 101, upon receiving a VNC connection request from the terminal device 120, switches between VNC connection using the image forming apparatus 101 and VNC connection using the print control apparatus 105. Note that the hardware configurations, etc. of the image forming apparatus 101, the terminal device 120, the print control apparatus 105, and the server computer 131 according to the third embodiment are the same as those in the first embodiment, and therefore the descriptions thereof are omitted.

Figure 17:
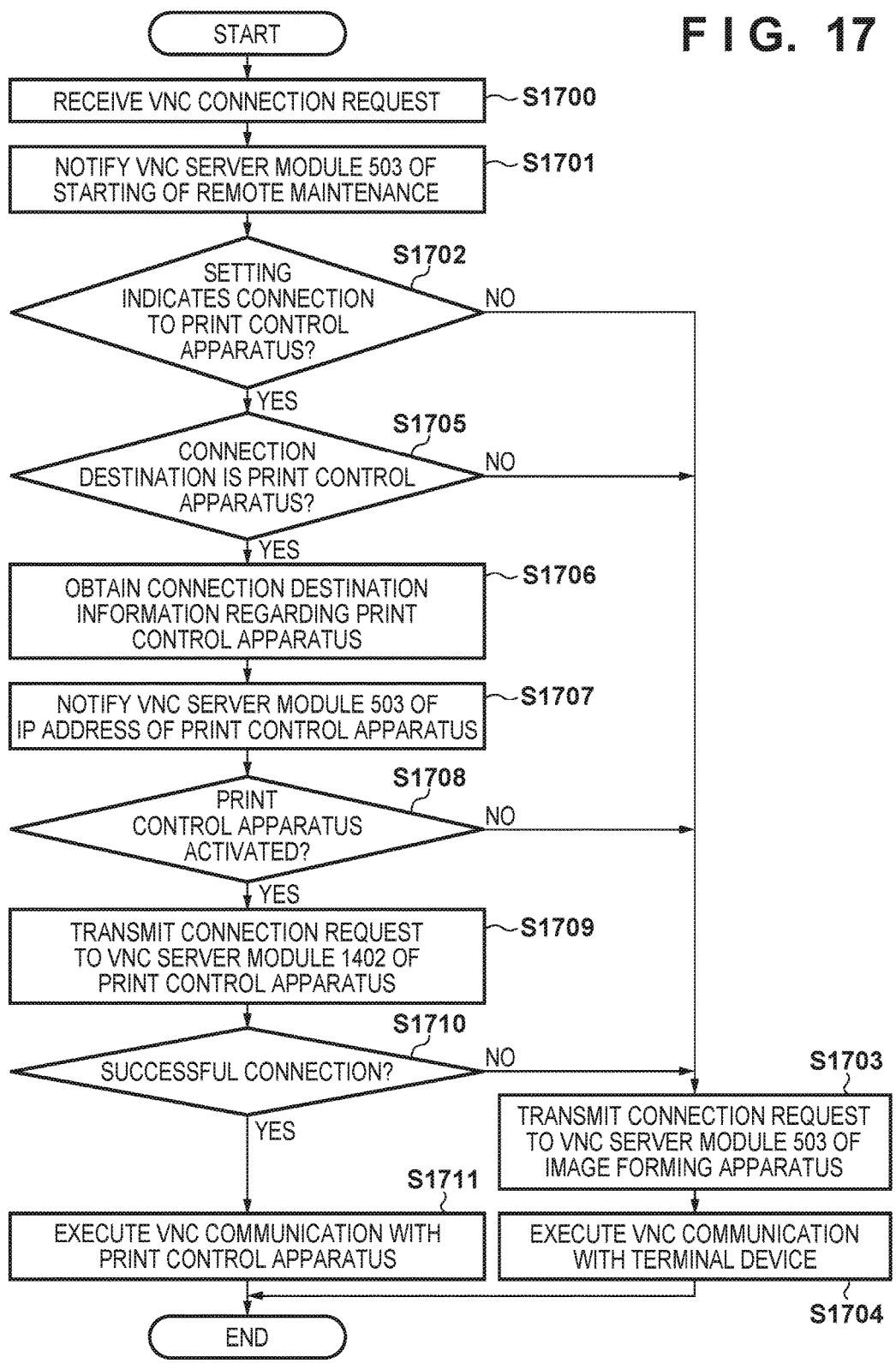
FIG. 17 is a flowchart for describing processing that is performed when a device connecter module of an image forming apparatus according to a third embodiment receives a VNC connection request in step S1108 or step S1508.

FIG. 17 is a flowchart for describing processing performed when the device connecter module 501 of the image forming apparatus 101 according to the third embodiment receives a VNC connection request in step S1108 or S1508. Note that the program executing this processing is stored in the external storage device 211, and this processing is achieved by the CPU 201 deploying the program to the RAM 202 and executing the program. Therefore, in the following description, it is assumed that the processing is executed by the modules shown in FIG. 5.

Upon receiving the VNC connection request transmitted in above-described step S1108 or S1508 in step S1700, the processing proceeds to step S1701. In step S1701, the device connecter module 501 notifies the VNC server module 503 of the fact that remote maintenance from the terminal device 120 has been started. Upon being notified, the VNC server module 503 enters a mode for limiting connection sources from which VNC connection is permitted. Specifically, the VNC server module 503 enters a mode in which connection from only connection sources whose IP address is a local loopback address is permitted. Next, the processing proceeds to step S1702, and the device connecter module 501 determines whether or not the image forming apparatus 101 has been set so as to connect to the print control apparatus 105 at this point in time. Here, if it is determined that the image forming apparatus 101 has not been set so as to connect to the print control apparatus 105, the processing proceeds to step S1703, and the device connecter module 501 transmits a connection request to the VNC server module 503. The subsequent processing is the same as steps S1303 and S1304 in the flowchart shown in FIG. 13, and therefore the descriptions thereof are omitted.

On the other hand, if it is determined in step S1702 that the image forming apparatus 101 has been set so as to connect to the print control apparatus 105, the processing proceeds to step S1705. In step S1705, the device connecter module 501 determines where the VNC server module that has been set to the image forming apparatus 101 as the connection destination is, i.e. whether the connection destination is the print control apparatus 105 or the image forming apparatus 101.

Figure 18:
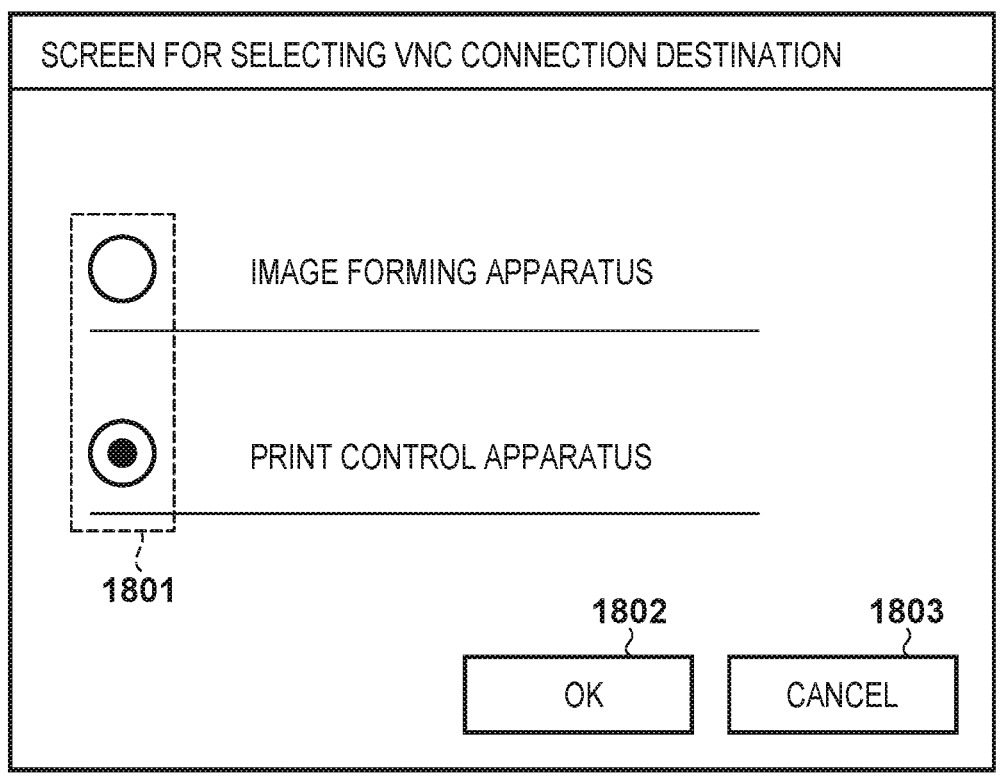
FIG. 18 depicts a view showing an example of a setting screen that is displayed on an operation panel of the image forming apparatus according to the third embodiment, and is used for setting a connection destination to which a VNC server is to connect.

FIG. 18 depicts a view showing an example of a setting screen that is displayed on the operation panel 205 of the image forming apparatus 101 according to the third embodiment, and is used for setting a connection destination to which a VNC server is to connect.

A check button 1801 is a button used for selecting the VNC server module 503 of the image forming apparatus 101 or the VNC server module 1402 of the print control apparatus 105 as the destination of VNC connection. Upon the user selecting the desired device as the connection destination and pressing an OK button 1802, the selected connection destination is saved. Also, upon the user pressing a cancel button 1803, the connection destination of the VNC via this screen is not saved, and this screen is terminated. The example in FIG. 18 shows a situation in which the VNC server module 1402 of the print control apparatus 105 has been selected.

In step S1705, information regarding the connection destination that has been set by using the screen shown in FIG. 18 is obtained. Here, if the connection destination is the VNC server module 503 of the image forming apparatus 101, the processing proceeds to step S1703, and if the connection destination is the VNC server module 1402 of the print control apparatus 105, the processing proceeds to step S1706. Processing performed in steps S1706 to S1711 is the same as the processing performed in steps S1305 to S1310 shown in FIG. 13, and therefore the description thereof is omitted.

As described above, according to the third embodiment, the image forming apparatus can select the image forming apparatus or the print control apparatus as the connection destination in response to a VNC connection request from the terminal device.

Fourth Embodiment

Next, a fourth embodiment of the present invention will be described. In the fourth embodiment, it is assumed that the terminal device 120 switches the destination of the VNC connection request between the image forming apparatus 101 and the print control apparatus 105. Note that the hardware configurations, etc. of the image forming apparatus 101, the terminal device 120, the print control apparatus 105, and the server computer 131 according to the fourth embodiment are the same as those in the first embodiment, and therefore the description thereof is omitted.

The fourth embodiment is different in the processing performed in step S1705 of the flowchart shown in FIG. 17 referenced in the third embodiment. Specifically, information regarding the VNC server module of the connection destination that has been set in the connection request that is to be transmitted to the image forming apparatus 101 in step S1108 or S1508 is obtained in step S1705.

Figure 19:
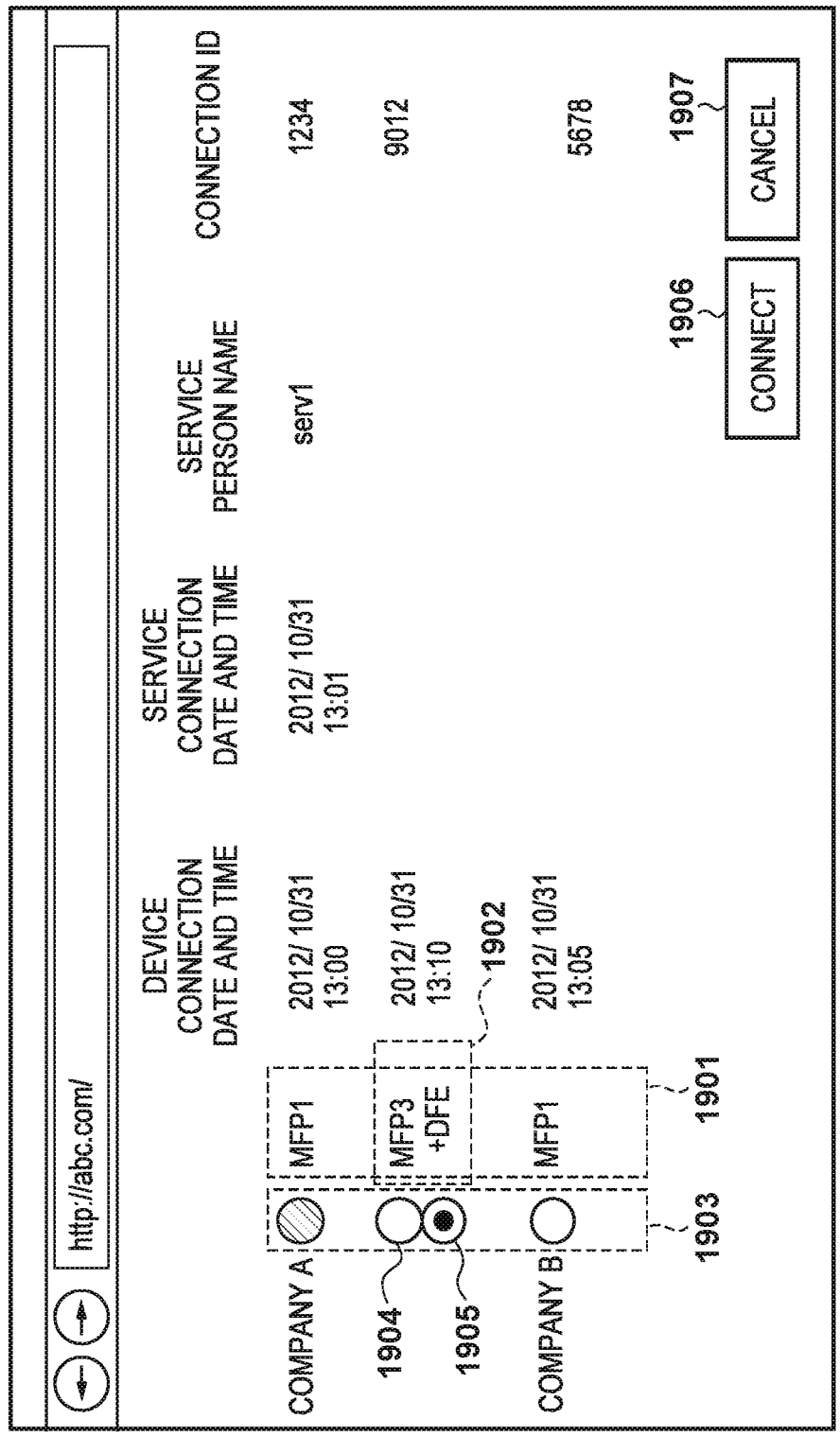
FIG. 19 depicts a view showing an example of a screen that is displayed on a web browser of a terminal device according to a fourth embodiment.

FIG. 19 depicts a view showing an example of a screen that is displayed on the web browser 901 of the terminal device 120 according to the fourth embodiment.

As described above, the serial numbers of image forming apparatuses and the names of customer companies are registered in the database 703, and a device name 1901 shows the model names 812 of the image forming apparatuses that are grouped by company name. A reference numeral 1902 indicates that the print control apparatus 105 is connected to the image forming apparatus 101. Here, "DFE" denotes a digital front end controller, and indicates the print control apparatus 105. Upon a service person checking a check box 1903 of the name of the device to which the service person wishes to connect, and pressing a connection button 1906 on this screen, a connection request is transmitted from the terminal device 120 to the VNC server module of the corresponding apparatus, namely the image forming apparatus 101 or the print control apparatus 105.

In the case of the image forming apparatus 101 to which the print control apparatus 105 is connected as shown in FIG. 1, check buttons 1904 and 1905 are arranged such that the image forming apparatus 101 and the print control apparatus 105 can be separately selected. Here, a connection request is submitted such that connection to the image forming apparatus 101 is established if the check button 1904 is selected and the connection button 1906 is pressed, and connection to the print control apparatus 105 is established if the check button 1905 is selected and the connection button 1906 is pressed. A cancel button 1907 is used to cancel the setting on this screen and terminate the processing. FIG. 19 shows a situation in which selection has been made to connect to the print control apparatus 105.

Thus, in the fourth embodiment, in step S1705, the device connecter module 501 of the image forming apparatus 101 obtains information regarding the connection request specified on the screen shown in FIG. 19. Here, if the connection destination is the image forming apparatus 101, the processing proceeds to step S1703, and a connection request is transmitted to the VNC server module 503 of the image forming apparatus 101. On the other hand, if the connection destination is the print control apparatus 105, the processing proceeds to step S1706.

As described above, according to the fourth embodiment, the terminal device can specify the image forming apparatus or the print control apparatus connected to the image forming apparatus as the VNC connection destination.

Fifth Embodiment

Next, a fifth embodiment of the present invention will be described. In the fifth embodiment, it is assumed that the terminal device 120, the print control apparatus 105, and the image forming apparatus 101 are connected to the same remote maintenance communication path, and the terminal device 120 performs VNC communication with the print control apparatus 105 and the image forming apparatus 101. Note that the hardware configurations, etc. of the image forming apparatus 101, the terminal device 120, the print control apparatus 105, and the server computer 131 according to the fifth embodiment are the same as those in the above-described embodiments, and therefore the description thereof is omitted.

Figure 20:
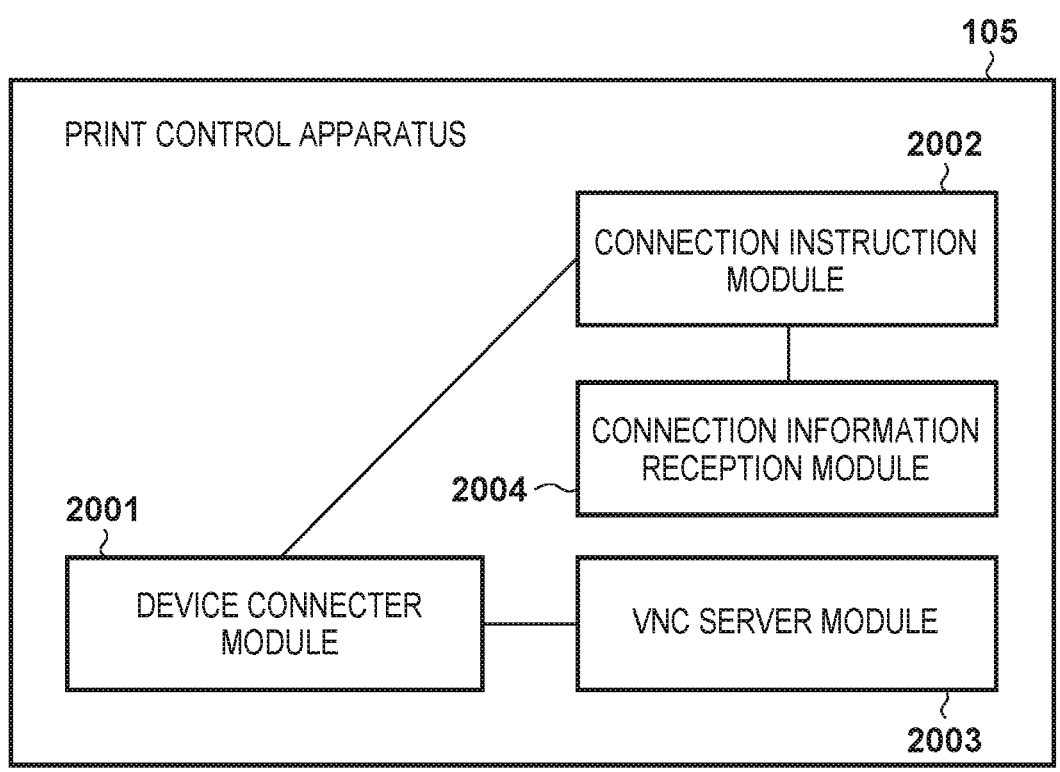
FIG. 20 is a block diagram for describing a software configuration of a print control apparatus according to a fifth embodiment.

FIG. 20 is a block diagram for describing a software configuration of the print control apparatus 105 according to the fifth embodiment. The programs of the modules shown in this block diagram are stored in the external storage device 309, and their functions are achieved by the CPU 301 deploying the programs to the RAM 302 and executing the programs.

Upon receiving an instruction from a connection instruction module 2002, a device connecter module 2001 establishes a connection with the server connecter module 701 of the server computer 131, and thereafter mediates communication between the server connecter module 701 and a VNC server module 2003. A connection information reception module 2004 receives data that has been obtained by the image forming apparatus 101 when connecting to the server connecter module 701 and that is transmitted from the image forming apparatus 101. Upon receiving data from the connection information reception module 2004, the connection instruction module 2002 transmits a connection instruction to the device connecter module 501 of the image forming apparatus 101. The VNC server module 2003 provides VNC server functions. Specifically, upon establishing a connection in response to a request from a VNC client, the VNC server module 2003 transmits, to the VNC client that is the connection destination, a screen that is the same as the screen displayed on the console unit 305, according to the RFB protocol. For example, the user of the information processing apparatus 106 in the user environment can remotely operate the print control apparatus 105 by activating VNC client software using the information processing apparatus 106, and accessing the print control apparatus 105. In the fifth embodiment, as with the VNC server module 503 of the image forming apparatus 101, the VNC server module 2003 communicates with only one connection destination. However, a connection may be established in another way.

Figure 21:
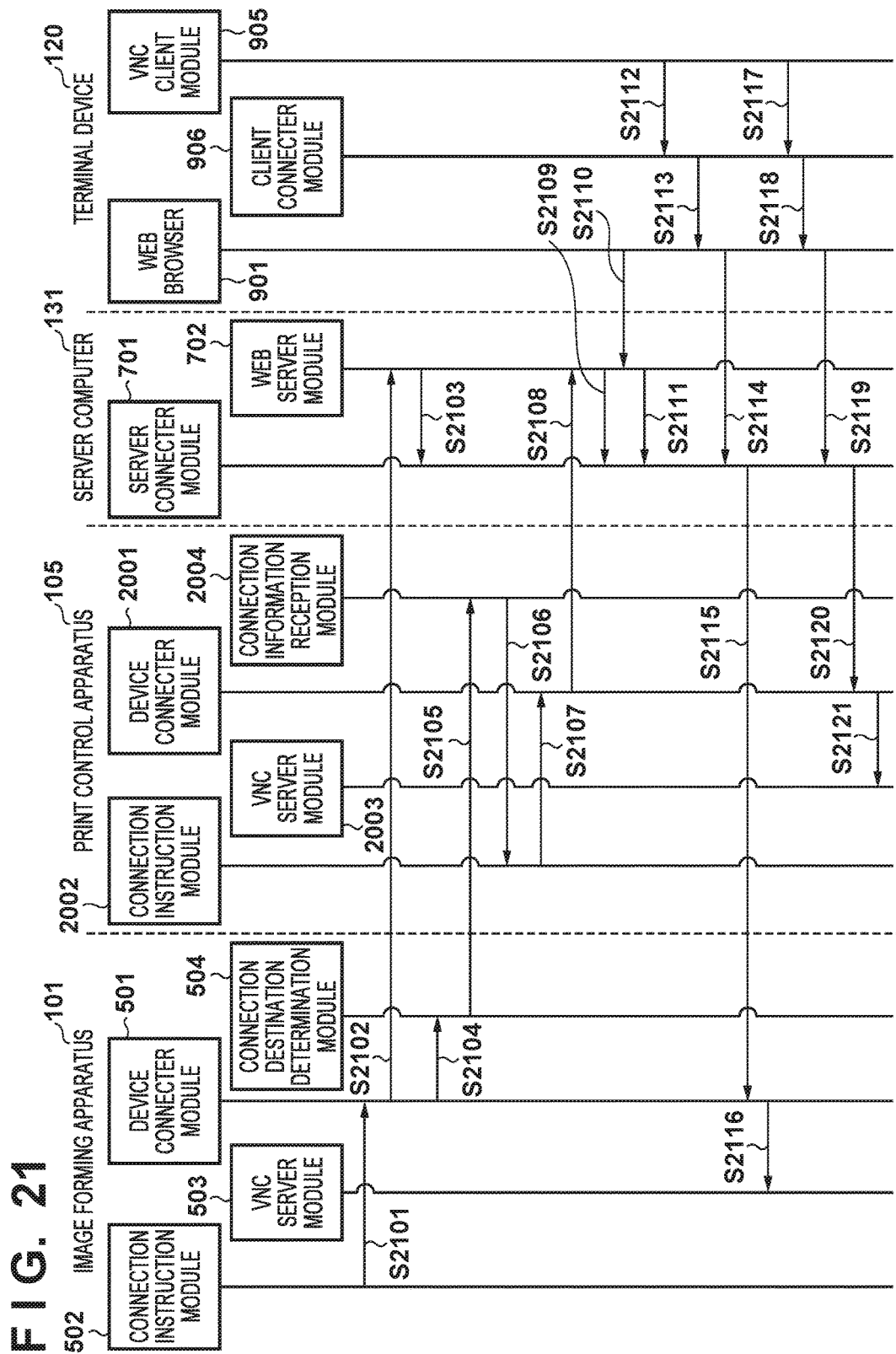
FIG. 21 is a sequence diagram for describing processing that is performed until a web browser of a terminal device according to the fifth embodiment and a VNC server module of the image forming apparatus establish a connection, and processing that is performed until a VNC server module of the print control apparatus establishes a connection.

FIG. 21 is a sequence diagram for describing processing that is performed until the web browser 901 of the terminal device 120 according to the fifth embodiment and the VNC server module 503 of the image forming apparatus 101 establish a connection, and processing that is performed until the VNC server module 2003 of the print control apparatus 105 establishes a connection. Here, processing performed by the image forming apparatus 101 is achieved by the CPU 201 deploying a program stored in the external storage device 211 to the RAM 202 and executing the program. Also, processing performed by the print control apparatus 105 is achieved by the CPU 301 deploying a program stored in the external storage device 309 to the RAM 302 and executing the program. Furthermore, processing performed by the server computer 131 and the terminal device 120 is achieved by the CPU 401 deploying programs stored in the HDD 412 to the RAM 403 and executing the programs.

In step S2101, the connection instruction module 502 of the image forming apparatus 101 transmits a connection instruction to the device connecter module 501. Next, in step S2102, the device connecter module 501 connects to the web server module 702 of the server computer 131, and transmits information such as the device name of the image forming apparatus 101. At this time, the print control apparatus 105 relays the connection request using the NAT function. Thereafter, although a description is omitted, when the image forming apparatus 101 and the web browser 901 of the terminal device 120 communicate with each other, the NAT function of the print control apparatus 105 relays the communication.

Upon detecting a connection request from the image forming apparatus 101, the web server module 702 of the server computer 131 issues a connection ID, and at the same time, registers the received information such as the device name in the database 703. Next, in step S2103, the web server module 702 notifies the server connecter module 701 of this connection and the connection ID. Thus, the server connecter module 701 manages connection from each of a plurality of image forming apparatuses based on the connection ID. Remote maintenance is realized by using the VNC protocol to share a screen between the VNC clients that are connected by specifying the connection ID. In other words, the server connecter module 701 can manage the connected session for each connection ID, and perform remote maintenance for each connection ID.

In the fifth embodiment, it is assumed that there are three terminals, namely the image forming apparatus 101, the print control apparatus 105, and the terminal device 120. However, four or more terminals may be connected. In another embodiment, instead of the web server module 702 issuing the connection ID, the server connecter module 701 may issue the connection ID at the time of acceptance, and the web server module 702 may receive the connection ID and register the connection ID in the database 703. Alternatively, the server connecter module 701 may register the connection ID in the database 703 by itself.

Subsequently, in step S2104, the device connecter module 501 notifies the connection destination determination module 504 of the connection ID, and transmits an instruction to connect to the print control apparatus 105. Consequently, in step S2105, the connection destination determination module 504 notifies the connection information reception module 2004 of the print control apparatus 105, of connection information.

Figure 22:
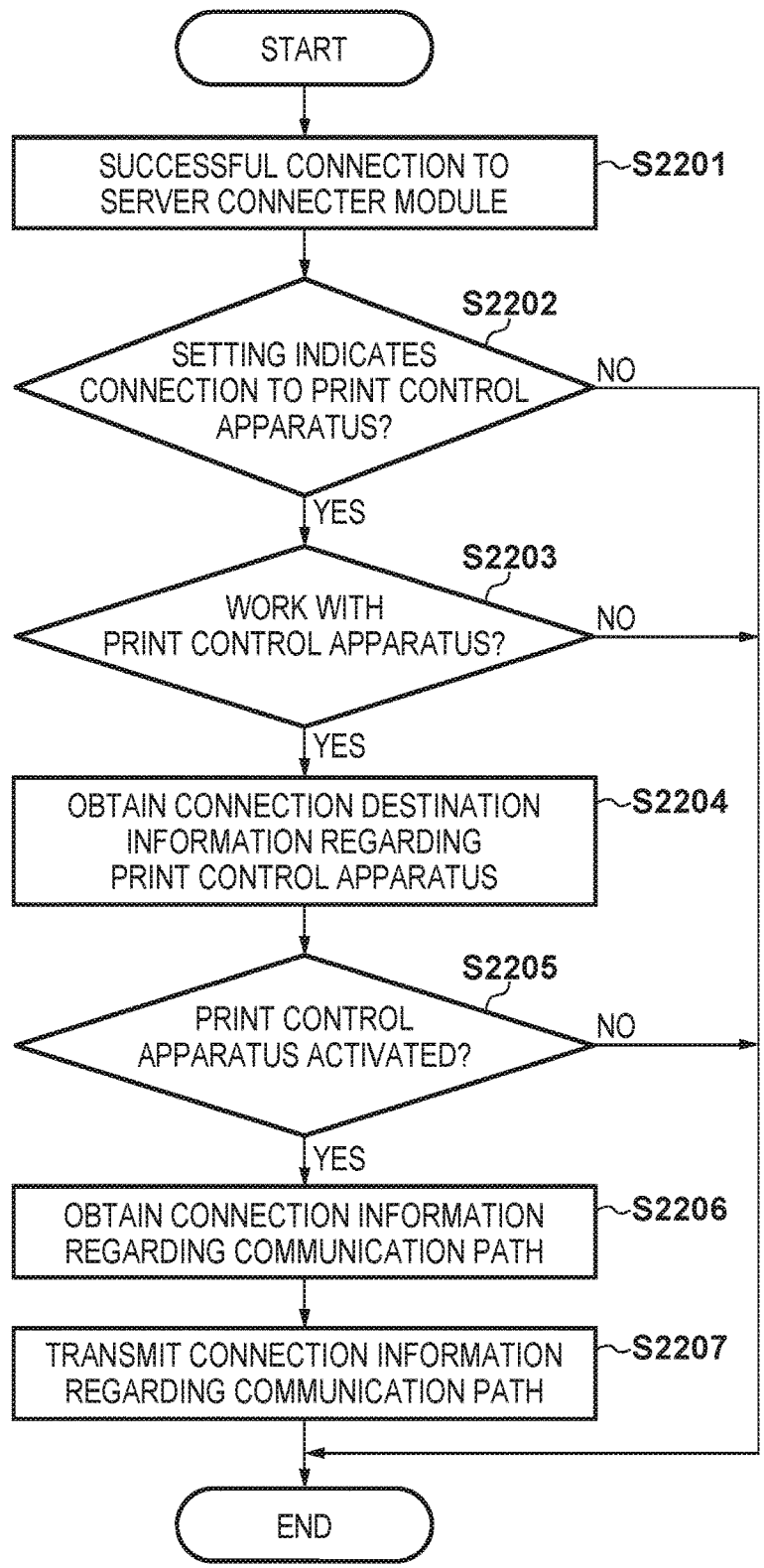
FIG. 22 is a flowchart for describing processing performed by the image forming apparatus according to the fifth embodiment to provide connection information to the print control apparatus.

FIG. 22 is a flowchart for describing processing performed by the image forming apparatus 101 according to the fifth embodiment to provide connection information to the print control apparatus 105. Note that the program executing this processing is stored in the external storage device 211, and this processing is achieved by the CPU 201 deploying the program to the RAM 202 and executing the program. Therefore, in the following description, it is assumed that the processing is executed by the modules shown in FIG. 5.

First, upon successfully connecting to the server connecter module 701 of the server computer 131 in step S2201, the device connecter module 501 of the image forming apparatus 101 proceeds to step S2202. Then, in step S2202, the device connecter module 501 determines whether or not the image forming apparatus 101 has been set so as to connect to the print control apparatus 105 at this point in time. Here, if it is determined that the image forming apparatus 101 has not been set so as to connect to the print control apparatus 105, the device connecter module 501 terminates this connection processing.

On the other hand, if it is determined in step S2202 that the image forming apparatus 101 has been set so as to connect to the print control apparatus 105, the processing proceeds to step S2203. In step S2203, the device connecter module 501 determines whether or not to cause the print control apparatus 105 to work with the device connecter module 501 and connect to the server connecter module 701 of the server computer 131.

Figure 23:
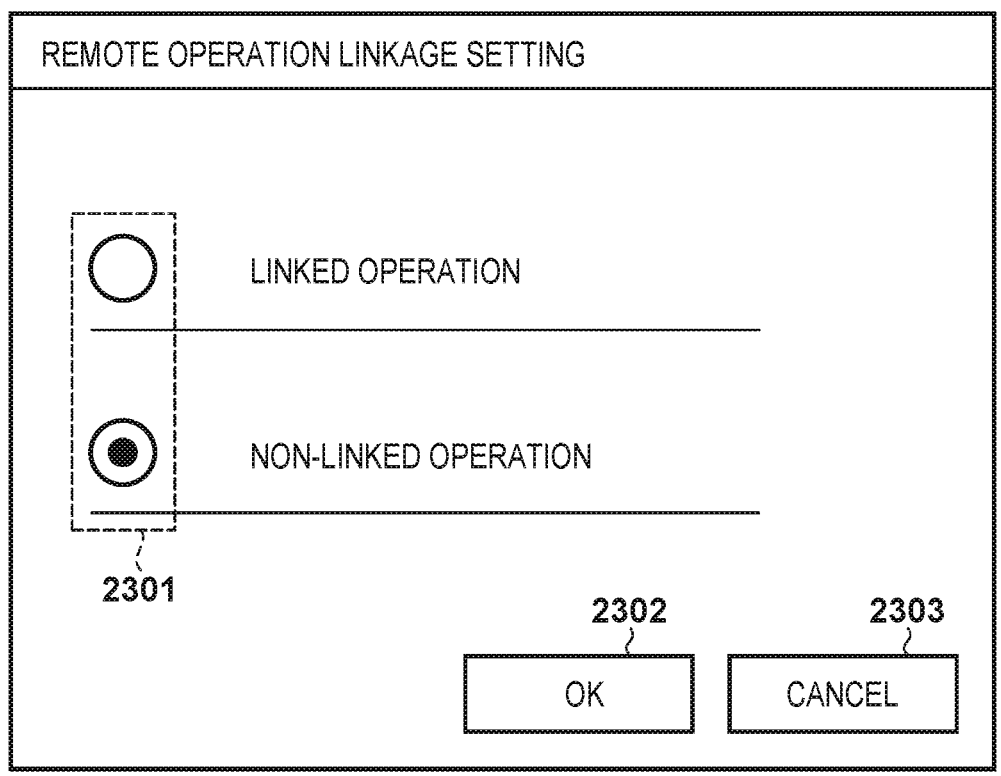
FIG. 23 depicts a view showing an example of a screen that is displayed on an operation panel of the image forming apparatus according to the fifth embodiment, and is used for linkage setting.

FIG. 23 depicts a view showing an example of a setting screen that is displayed on the operation panel 205 of the image forming apparatus 101 according to the fifth embodiment, and is used for linkage setting.

A check box 2301 is a button for setting whether or not to work with the print control apparatus 105. FIG. 23 shows that "non-linked operation" has been selected. Upon the user checking the check box 2301 and pressing an OK button 2302, the setting on this screen is saved. A cancel button 2303 is used for cancelling the setting on this screen.

In step S2203, the device connecter module 501 obtains the linkage setting that has been set via the screen shown in FIG. 23. If "non-linked operation" has been set, this processing is terminated. Otherwise, the processing proceeds to step S2204. In step S2204, the device connecter module 501 obtains the connection destination address of the print control apparatus 105, and the processing proceeds to step S2205. In step S2205, the device connecter module 501 determines whether or not the print control apparatus 105 has been properly activated. Here, if it is determined that the print control apparatus 105 has not been properly activated, the device connecter module 501 terminates this processing. If it is determined that the print control apparatus 105 has been properly activated, the processing proceeds to step S2206. Note that the determination in step S2205 regarding whether or not the print control apparatus 105 has been properly activated is made based on whether or not network communication is available and RIP processing and print job transmission processing are already available. In step S2206, the device connecter module 501 obtains information that is necessary for the print control apparatus 105 to connect to the server connecter module 701 of the server computer 131. Examples of this information include a connection ID of the remote maintenance communication path to which the image forming apparatus 101 has connected and that has been returned by the server connecter module 701 to which the image forming apparatus 101 has connected, and authentication information in the case where authentication is needed when accessing the server computer 131. These are examples and information other than these examples may be obtained and transmitted. In step S2206, upon the print control apparatus 105 obtaining the connection ID of the remote maintenance communication path, the processing proceeds to step S2207. In step S2207, the connection destination determination module 504 of the image forming apparatus 101 transmits the connection information obtained in step S2206 to the print control apparatus 105, and terminates this processing. Thus, the print control apparatus 105 can connect to the server computer 131 based on the connection information obtained from the image forming apparatus 101.

Figure 24:
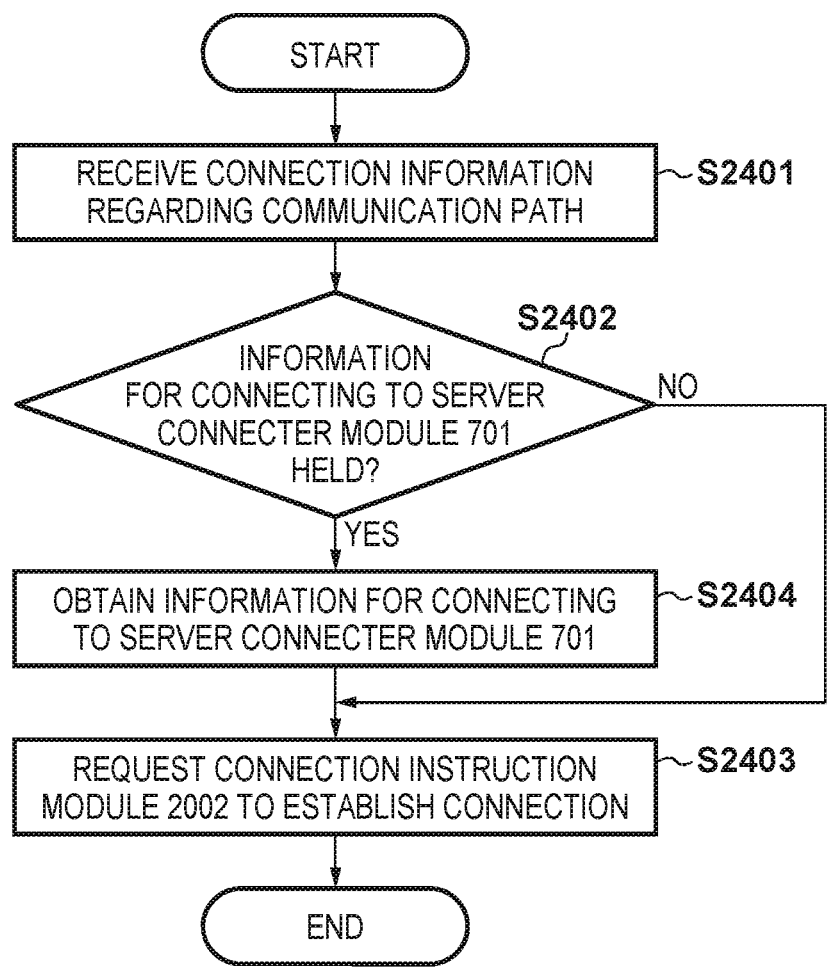
FIG. 24 is a flowchart for describing processing that is performed when the print control apparatus according to the fifth embodiment connects to a server connecter module of a server computer.

FIG. 24 is a flowchart for describing processing that is performed when the print control apparatus 105 according to the fifth embodiment connects to the server connecter module 701 of the server computer 131. Note that the program executing this processing is stored in the external storage device 309, and this processing is achieved by the CPU 301 deploying the program to the RAM 302 and executing the program.

In step S2401, the connection information reception module 2004 of the print control apparatus 105 obtains the connection information transmitted from the connection destination determination module 504 of the image forming apparatus 101 in step S2207 shown in FIG. 22, and the processing proceeds to step S2402. In step S2402, the connection information reception module 2004 determines whether or not the print control apparatus 105 holds information that is necessary to connect to the server connecter module 701 of the server computer 131. If it is determined that the necessary information is not held by the print control apparatus 105, the processing proceeds to step S2403. In step S2403, the connection information reception module 2004 transmits data that has been received from the connection destination determination module 504 of the image forming apparatus 101 to the connection instruction module 2002, and requests the connection instruction module 2002 to connect to the server connecter module 701 of the server computer 131. This processing corresponds to step S2106 shown in FIG. 21.

On the other hand, if it is determined in step S2402 that the print control apparatus 105 holds information that is necessary to connect to the server connecter module 701, the processing proceeds to step S2404, and the connection information reception module 2004 contains the information held by the print control apparatus 105. Examples of this information include authentication information in the case where authentication is needed when accessing the server computer 131. For example, if this information is not transmitted from the image forming apparatus 101, the connection information reception module 2004 obtains the information from the print control apparatus 105. Thus, upon obtaining information from the print control apparatus 105 in step S2404, the processing proceeds to step S2403, the connection information reception module 2004 requests the connection instruction module 2002 to connect to the server connecter module 701 of the server computer 131, and terminates this processing. The following is a continuation of the description with reference to FIG. 21.

In step S2107, the connection instruction module 2002 transmits a connection instruction to the device connecter module 2001. In the fifth embodiment, it is assumed that the connection instruction is received from the device connecter module 501 of the image forming apparatus 101. However, as with the connection instruction module 502 of the image forming apparatus 101, the print control apparatus 105 may also be provided with a user interface on the console unit 305, and prompt the user to input an instruction. If this is the case, the user may be allowed to input the connection ID of the connection established by the image forming apparatus 101. Next, in step S2108, the device connecter module 2001 connects to the web server module 702 of the server computer 131, and transmits information such as the device name of the image forming apparatus 101 and the connection ID. Next, in step S2109, the web server module 702 connects to the server connecter module 701, and transmits information such as the device name of the print control apparatus 105 and the connection ID to the server connecter module 701. In response, the server connecter module 701 determines whether or not a connection ID of a remote maintenance communication path that has already connected to the image forming apparatus 101 exists in the database 703, based on the connection ID of the remote maintenance communication path thus transmitted. If the connection ID is in the database 703, the server connecter module 701 saves the data of the connection ID data after adding information regarding the print control apparatus 105 thereto, and connects to the remote maintenance communication path having the same connection ID.

Here, for example, FIG. 8B shows a situation where the image forming apparatus specified by the serial number "SN0004" has connected to the remote maintenance communication path having the same connection ID. Thus, the image forming apparatus 101 and the print control apparatus 105 can be managed by using the same connection ID ("9012"), and remote maintenance can be performed on these apparatuses simultaneously. On the other hand, if the connection ID does not exist in the database 703, the server connecter module 701 issues a new connection ID, and manages the connection information regarding the print control apparatus 105.

Next, a description will be given of a sequence in which the terminal device 120 uses the web browser 901 to connect to the print control apparatus 105 and the image forming apparatus 101 in a situation where the image forming apparatus 101 has connected to the server computer 131 and the print control apparatus 105.

First, in step S2110, the web browser 901 of the terminal device 120 connects to the web server module 702 of the server computer 131.

Figure 25:
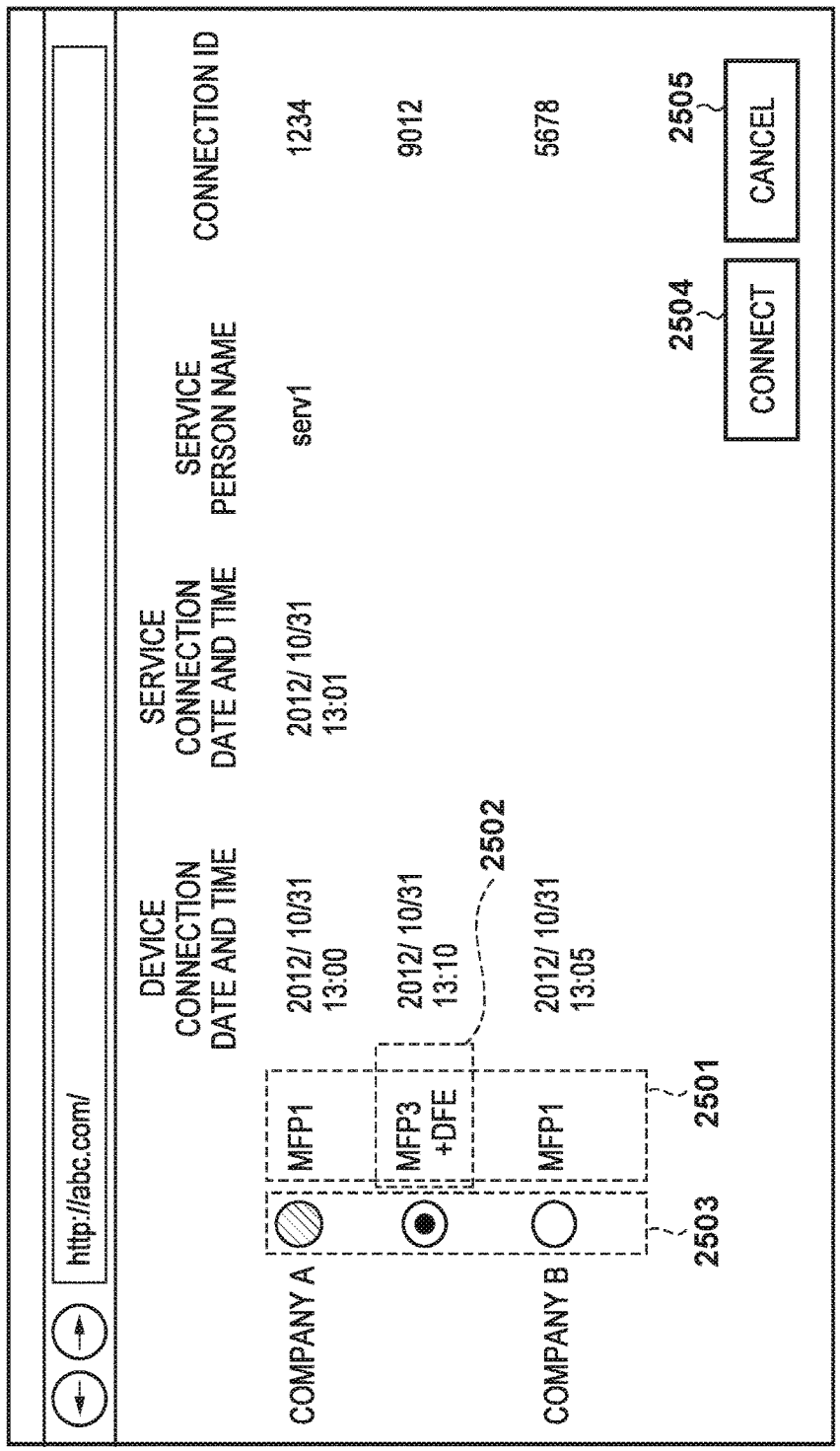
FIG. 25 depicts a view showing an example of a screen that is displayed on a web browser of a terminal device after step S2110 in FIG. 21 is complete.

FIG. 25 depicts a view showing an example of a screen that is displayed on the web browser 901 of the terminal device 120 when step S2110 shown in FIG. 21 is complete.

The serial numbers of image forming apparatuses and the names of customer companies are registered in the database 703, and a device name 2501 shows the model names 812 of the image forming apparatuses that are grouped by company name. A reference numeral 2502 denotes that a print control apparatus (DFE) is connected to an image forming apparatus (MFP3). The service person selects a check box 2503 corresponding to the name of the device that is the transmission destination to which the service person wishes to connect, and presses a connection button 2504 on this screen. Consequently, a connection request is transmitted to the VNC server. Also, if a cancel button 2505 is pressed, processing is terminated without establishing a connection. In FIG. 25, an image forming apparatus 101 that has a serial number "SN0004" shown in FIG. 8B and is connected to the print control apparatus 105 is selected.

Here, if the connection button 2504 is pressed, the web server module 702, in step S2111, submits a connection request with respect to the target connection ID to the server connecter module 701. Consequently, the server connecter module 701, the device connecter module 501 of the image forming apparatus 101, and the device connecter module 2001 of the print control apparatus 105 establish a connection. In other words, the server connecter module 701 serves as a server, establishes connections with a plurality of clients, and is enabled to relay data transmitted from one client, to another client.

Figure 26:
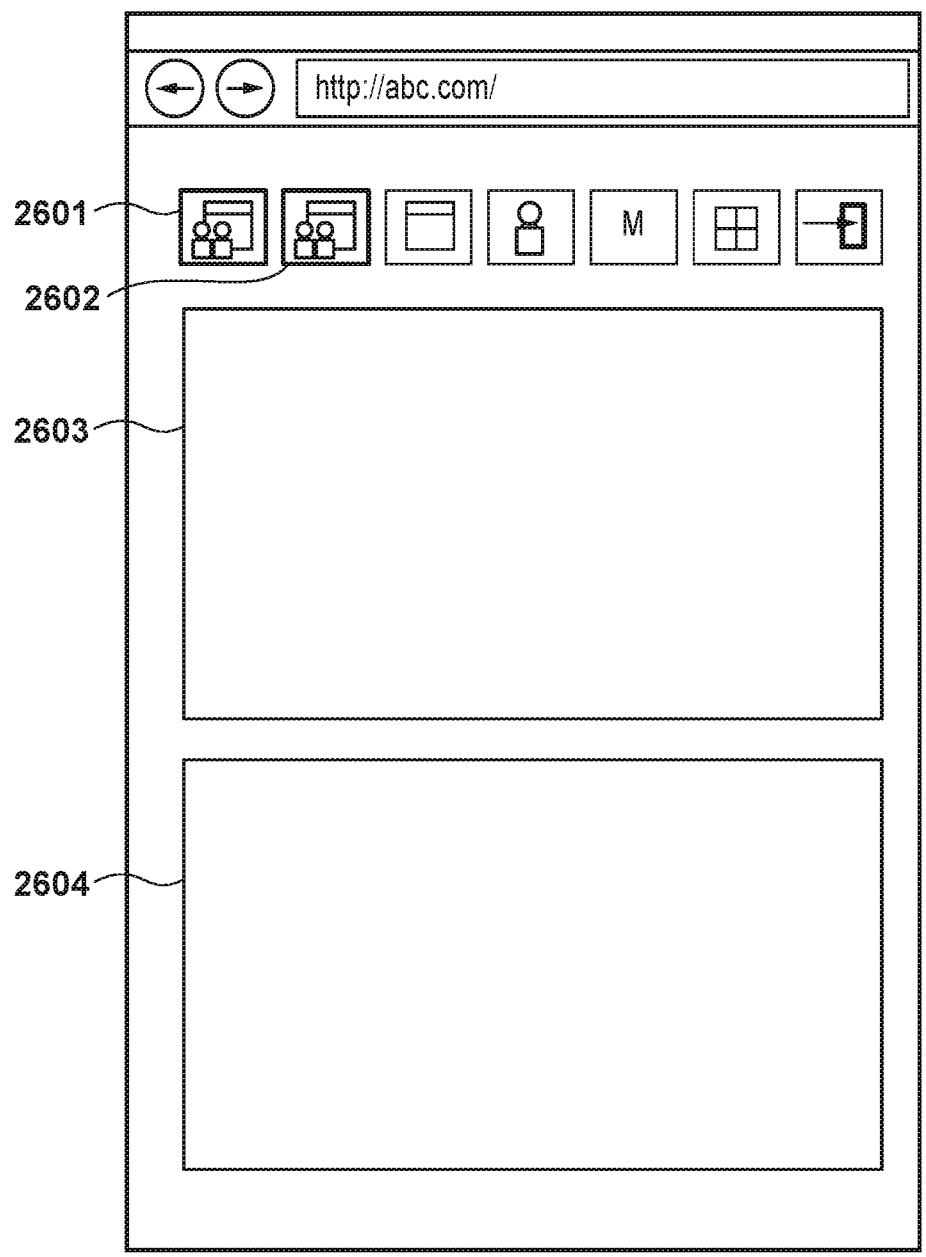
FIG. 26 depicts a view showing an example of a screen of the web browser of the terminal device according to the fifth embodiment, which is displayed when a service person selects an image forming apparatus to which a print control apparatus is connected, and presses a connection button.

FIG. 26 depicts a view showing an example of a screen of the web browser 901 of the terminal device 120 according to the fifth embodiment, which is displayed when a service person selects the image forming apparatus 101 to which the print control apparatus 105 is connected, and presses the connection button 2504.

A connection button 2601 is a button for inputting an instruction to establish a VNC connection with the image forming apparatus 101, and a connection button 2602 is a button for inputting an instruction to establish a VNC connection with the print control apparatus 105. An area 2603 is a remote maintenance screen for the image forming apparatus 101, and an area 2604 is a remote maintenance screen for the print control apparatus 105. These areas 2603 and 2604 are screens for various functions (the functions of displaying moving pictures, images, VNC connection, etc.) for remote maintenance.

In the fifth embodiment, it is assumed that VNC connection is also performed via these screens. However, a separate VNC client may be activated and remote maintenance may be performed on the VNC client. Upon the service person pressing the connection button 2601 of the web browser 901, the VNC client module 905 and the client connecter module 906 of the terminal device 120 are activated in step S2112. Then, the VNC client module 905 detects that a connection request has been submitted to a VNC server. Upon receiving this request, the VNC client module 905 transmits this connection request to the client connecter module 906. Here, the protocol according to which the VNC client module 905 transmits the request is the VNC protocol. Upon receiving this request, the client connecter module 906 transmits a connection request to the web browser 901 in step S2113. This connection request follows the HTTP protocol, and therefore the client connecter module 906 modifies the connection request as appropriate such that communication can be performed using the VNC protocol via the HTTP protocol, and transmits the modified connection request.

Then, in step S2114, the web browser 901 transmits a connection request to the server connecter module 701 of the server computer 131. Thus, upon receiving this connection request, the server connecter module 701 transmits a connection request to the device connecter module 501 of the image forming apparatus 101 in step S2115. The device connecter module 501 determines whether or not a VNC connection request is included in the received HTTP data, and if a VNC connection request is included, transmits this connection request to the VNC server module 503 in step S2116. Consequently, the VNC client module 905 of the terminal device 120 and the VNC server module 503 of the image forming apparatus 101 are enabled to communicate with each other. Consequently, information displayed on the operation panel 205 of the image forming apparatus 101 is displayed on the screen in the area 2603, and remote maintenance of the image forming apparatus 101 can be performed from the terminal device 120.

Next, upon the service person pressing the button 2602 shown in FIG. 26, the VNC client module 905 and the client connecter module 906 are activated in step S2117, and the VNC client module 905 detects that a connection request has been submitted to the VNC server. Upon receiving this request, the VNC client module 905 transmits this connection request to the client connecter module 906. Here, the protocol according to which the VNC client module 905 transmits the request is the VNC protocol. Upon receiving this request, the client connecter module 906 transmits a connection request to the web browser 901 in step S2118. This connection request follows the HTTP protocol. At this time, the client connecter module 906 modifies the connection request as appropriate such that communication can be performed using the VNC protocol via the HTTP protocol, and transmits the modified connection request.

Next, in step S2119, the web browser 901 transmits a connection request to the server connecter module 701. Consequently, in step S2120, the server connecter module 701 transmits a connection request to the device connecter module 2001 of the print control apparatus 105. The device connecter module 2001 determines whether or not a VNC connection request is included in the received HTTP data, and if a VNC connection request is included, transmits this connection request to the VNC server module 2003 in step S2121. Consequently, the VNC client module 905 and the VNC server module 2003 are enabled to communicate with each other. The screen information of the console unit 305 of the print control apparatus 105 is displayed on the screen in the area 2604, and remote maintenance of the print control apparatus 105 can be performed on the terminal device 120.

Next, a description will be given of the mechanism in which the device connecter module 501 of the image forming apparatus 101 and the device connecter module 2001 of the print control apparatus 105 transmit data to the web browser 901 of the terminal device 120.

The server connecter module 701 of the server computer 131 waits for data to be transmitted from the device connecter module 501 of the image forming apparatus 101 or the device connecter module 2001 of the print control apparatus 105. When transmitting data to the server connecter module 701, the device connecter modules 501 and 2001 use the POST method. Next, the server connecter module 701 transmits the received data to the web browser 901 of the terminal device 120. In this case, the server connecter module 701 transmits the data in response to the GET method according to the HTTP, which has already been transmitted by the terminal device 120. Consequently, data can be transmitted from the device connecter module 501 of the image forming apparatus 101 to the web browser 901 of the terminal device 120 via the device connecter module 2001 of the print control apparatus 105 and the server connecter module 701 of the server computer 131. Note that the mechanism in which the web browser 901 of the terminal device 120 transmits data to the device connecter module 501 of the image forming apparatus 101 and the device connecter module 2001 of the print control apparatus 105 is the same as above, and a description thereof is omitted.

In the fifth embodiment, it is assumed that the image forming apparatus 101 first connects to the server connecter module 701 of the server computer 131, notifies the print control apparatus 105 of information regarding this connection, and the print control apparatus 105 that has been notified connects to the server connecter module 701. However, the order of connection may be opposite. Furthermore, although it is assumed that the image forming apparatus 101 and the print control apparatus 105 work with each other and simultaneously establish a connection, it is possible that a connection is established with only one of these apparatuses. If this is the case, a setting screen for setting "linked operation" or "non-linked operation" may be provided for the operation panel 205 of the image forming apparatus 101 and the console unit 305 of the print control apparatus 105, and each apparatus may connect to the server connecter module 701 according to the setting value that has been set.

As described above, according to the fifth embodiment, it is possible to specify one or both of a print control apparatus and an image forming apparatus from a terminal device in a call center to perform VNC communication therewith.

Sixth Embodiment

Next, a sixth embodiment will be described. In the sixth embodiment, it is assumed that the print control apparatus 105 and the image forming apparatus 101 connect to the terminal device 120 via separate remote maintenance communication paths, and VNC communication with these apparatuses is enabled from the terminal device 120. Note that the hardware configurations, etc. of the image forming apparatus 101, the terminal device 120, the print control apparatus 105, and the server computer 131 according to the fifth embodiment are the same as those in the above-described embodiments, and therefore the description thereof is omitted.

Figure 27:
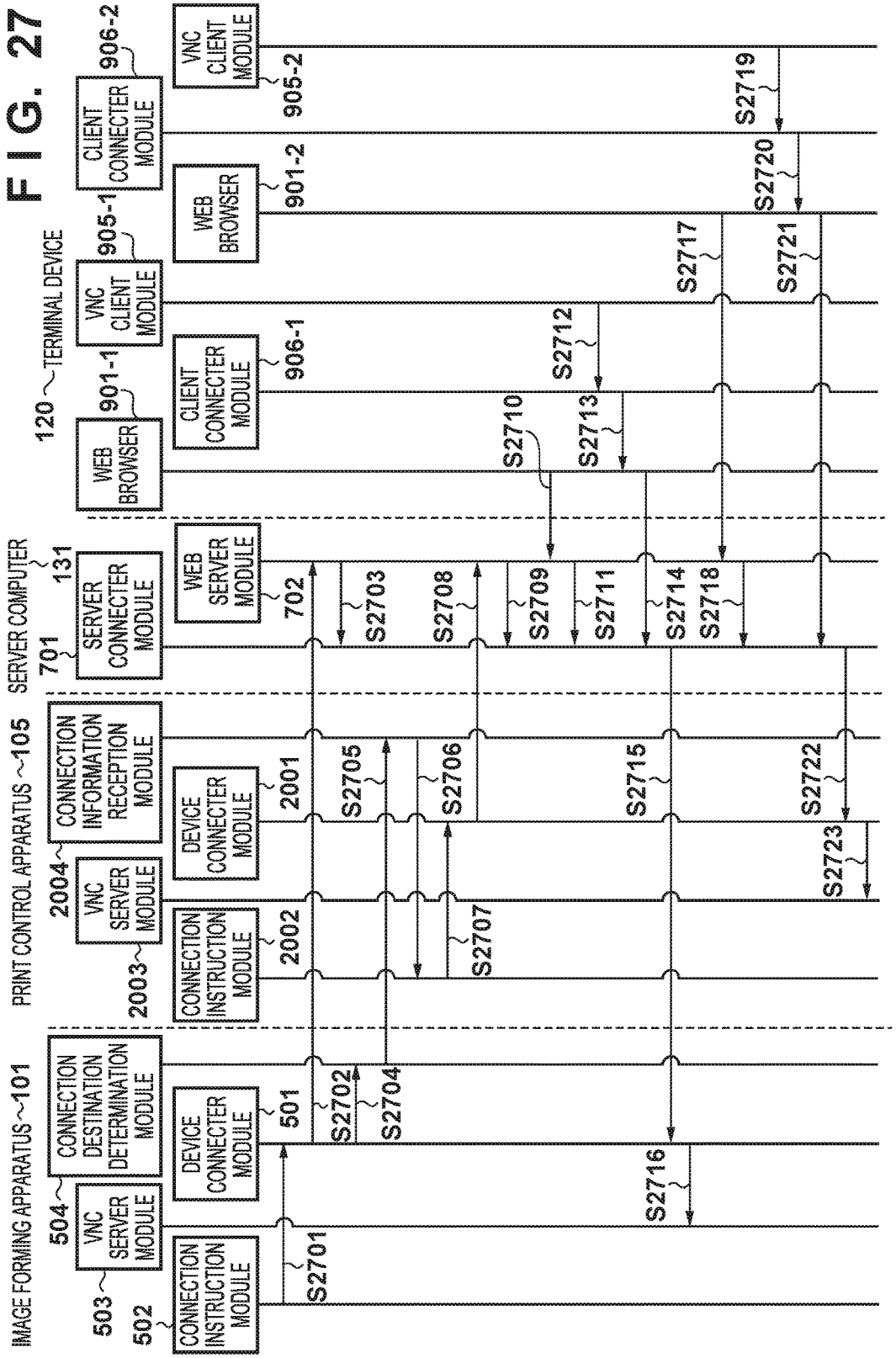
FIG. 27 is a sequence diagram for describing processing that is performed until a web browser of a terminal device according to a sixth embodiment and a VNC server module of an image forming apparatus establish a connection, and processing that is performed until the web browser of the terminal device and a VNC server module of a print control apparatus establish a connection.

FIG. 27 is a sequence diagram for describing processing that is performed until a web browser 901-1 of the terminal device 120 according to the sixth embodiment and the VNC server module 503 of the image forming apparatus 101 establish a connection, and processing that is performed until a web browser 901-2 of the terminal device 120 and the VNC server module 1001 of the print control apparatus 105 establish a connection. Here, processing performed by the image forming apparatus 101 is achieved by the CPU 201 deploying a program stored in the external storage device 211 to the RAM 202 and executing the program. Also, processing performed by the print control apparatus 105 is achieved by the CPU 301 deploying a program stored in the external storage device 309 to the RAM 302 and executing the program. Furthermore, processing performed by the server computer 131 and the terminal device 120 is achieved by the CPU 401 deploying programs stored in the HDD 412 to the RAM 403 and executing the programs. Note that, in FIG. 27, the web browsers 901-1 and 901-2, VNC client modules 905-1 and 905-2, and client connecter modules 906-1 and 906-2 indicate that a plurality of web browsers 901 of the terminal device 120 have been activated.

Steps S2701 to S2707 shown in FIG. 27 are the same as steps S2101 to S2107 shown in FIG. 21, and therefore a description thereof is omitted. In step S2708, the device connecter module 2001 connects to the web server module 702, and transmits information such as the device name of the print control apparatus 105 and the connection ID of the connection established by the image forming apparatus 101. Upon detecting connection from the print control apparatus 105, the web server module 702 issues a new connection ID, and at the same time, registers the received information such as the device name in the database 703. Next, in step S2709, the web server module 702 transmits the connection ID and a connection request to the server connecter module 701.

The connection ID of the remote maintenance communication path at this time is different from the connection ID that is returned by the image forming apparatus 101 when connecting to the server computer 131 in step S2702, and a new record for the print control apparatus 105 is registered in the database 703. Alternatively, it is possible to save the connection ID of the connection established by the image forming apparatus 101 in association with the connection ID of the print control apparatus 105 at the time of registering information regarding the print control apparatus 105 in the database 703.

Next, a description will be given of a sequence in which the terminal device 120 is connected to the connection between the image forming apparatus 101 and the server computer 131 by using the web browser 901-1.

In this case, in step S2710, the web browser 901-1 connects to the web server module 702 of the server computer 131.

Figure 28:
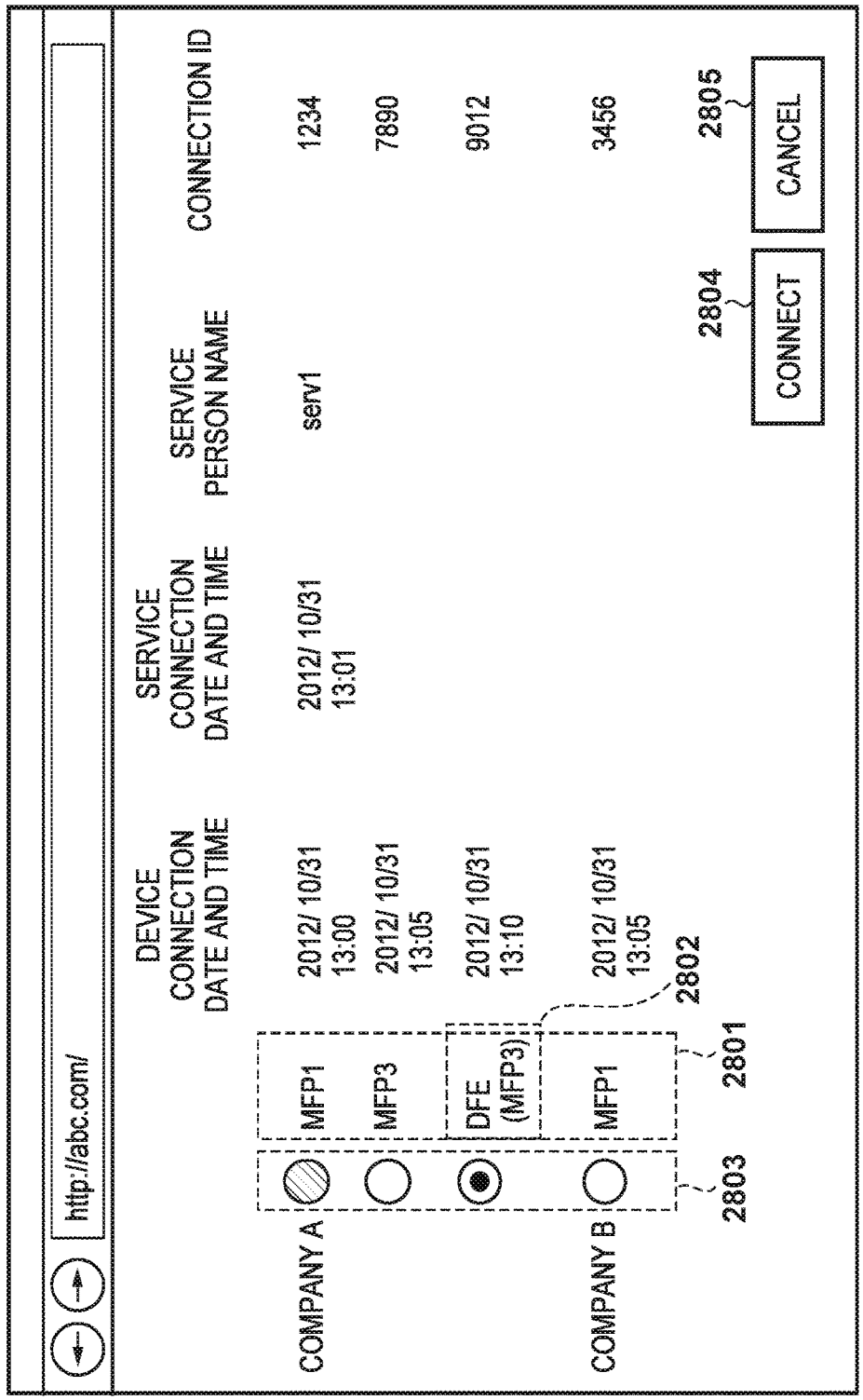
FIG. 28 depicts a view showing an example of a screen that is displayed on the web browser of the terminal device according to the sixth embodiment after step S2710 in FIG. 27 is complete.

FIG. 28 depicts a view showing an example of a screen that is displayed on the web browser 901-1 of the terminal device 120 according to the sixth embodiment when step S2710 shown in FIG. 27 is complete.

The serial numbers of image forming apparatuses and the names of customer companies are registered in the database 703, and a device name 2801 shows the model names of the image forming apparatuses that are grouped by company name. A reference numeral 2802 indicates that the image forming apparatus 101 to which the print control apparatus 105 is connected is connected. Upon a service person selecting a check box 2803 corresponding to the name of the device to which the service person wishes to connect, and pressing a connection button 2804 on this screen, a connection request is transmitted to the VNC server. A cancel button 2805 is used to cancel the setting on this screen and terminate the processing. Now, for example, the service person who is operating the terminal device 120 selects the image forming apparatus 101 as shown in the drawing and presses the connection button 2804. Consequently, in step S2711, the server connecter module 701 of the server computer 131 and the web server module 702 establish a connection with respect to the target connection ID.

FIG. 29 depicts a view showing an example of a screen that is displayed on the web browser 901-1 of the terminal device 120 according to the sixth embodiment when a service person selects the image forming apparatus 101 or the print control apparatus 105 and presses the connection button 2804 on the screen shown in FIG. 28.

A connection button 2901 is a button for establishing a VNC connection with a connected apparatus, and an area 2902 is a remote maintenance screen that displays a screen displayed on the console unit of the connected apparatus. The area 2902 is a screen for various functions (the functions of displaying moving pictures, images, VNC connection, etc.) for remote maintenance. In the sixth embodiment, it is assumed that VNC connection is also performed by using this screen. However, a separate VNC client may be activated and remote maintenance may be performed on the VNC client. In the case where remote maintenance using VNC is simultaneously performed with respect to two apparatuses, two web browsers are activated and connection processing is performed with respect to the apparatuses.

The following is a continuation of the description with reference to FIG. 27. Now, upon the service person pressing the button 2901 of the web browser 901-1, the VNC client module 905-1 and the client connecter module 906-1 of the terminal device 120 are activated. Consequently, in step S2712, the VNC client module 905-1 detects that a connection request for connection to the VNC server has been submitted, and first transmits this connection request to the client connecter module 906-1. Here, the protocol according to which the VNC client module 905-1 transmits the request is the VNC protocol. Upon receiving this request, the client connecter module 906-1 transmits a connection request to the web browser 901-1 in step S2713. This connection request follows the HTTP protocol, and therefore the client connecter module 906-1 modifies the connection request as appropriate such that communication can be performed using the VNC protocol via the HTTP protocol, and transmits the modified connection request. Then, in step S2714, the web browser 901-1 transmits a connection request to the server connecter module 701 of the server computer 131. Thus, in step S2715, the server connecter module 701 transmits a connection request to the device connecter module 501 of the image forming apparatus 101. The device connecter module 501 determines whether or not a VNC connection request is included in the received HTTP data, and if a VNC connection request is included, transmits this connection request to the VNC server module 503 in step S2716.

Consequently, the VNC client module 905-1 of the terminal device 120 and the VNC server module 503 of the image forming apparatus 101 are enabled to communicate with each other, and information displayed on the operation panel 205 of the image forming apparatus 101 is displayed on the screen in the area 2902 shown in FIG. 29. Thus, remote maintenance of the image forming apparatus 101 can be performed from the terminal device 120.

Next, a description will be given of a sequence in which the terminal device 120 is connected to the connection between the print control apparatus 105 and the server computer 131 by using the web browser 901-2.

In step S2717, the web browser 901-2 connects to the web server module 702 of the server computer 131. The operation is executed upon the service person who is operating the terminal device 120 selecting the print control apparatus 105 and pressing the connection button 2804 on the screen displayed as shown in FIG. 28. Thus, in step S2718, the server connecter module 701 of the server computer 131 and the web server module 702 establish a connection with respect to the target connection ID. Then, upon the service person pressing the button 2901 corresponding to the web browser 901-2 on the screen shown in FIG. 29, the VNC client module 905-2 and the client connecter module 906-2 of the terminal device 120 are activated.

Then, in step S2719, the VNC client module 905-2 detects that a connection request for connection to the VNC server has been submitted, and first transmits this connection request to the client connecter module 906-2. Here, the protocol according to which the VNC client module 905-2 transmits the request is the VNC protocol. Upon receiving this request, the client connecter module 906-2 transmits a connection request to the web browser 901-2 in step S2720. This connection request follows the HTTP protocol, and therefore the client connecter module 906-2 modifies the connection request as appropriate such that communication can be performed using the VNC protocol via the HTTP protocol, and transmits the modified connection request. Next, in step S2721, the web browser 901-2 transmits a connection request to the server connecter module 701 of the server computer 131. Consequently, in step S2722, the server connecter module 701 transmits a connection request to the device connecter module 2001 of the print control apparatus 105. The device connecter module 2001 determines whether or not a VNC connection request is included in the received HTTP data, and if a VNC connection request is included, transmits this connection request to the VNC server module 2003 in step S2723.

Consequently, the VNC client module 905-2 of the terminal device 120 and the VNC server module 2003 of the print control apparatus 105 are enabled to communicate with each other. Then, the screen displayed on the console unit 305 of the print control apparatus 105 is displayed in the area 2902 shown in FIG. 29, and remote maintenance of the print control apparatus 105 can be performed from the terminal device 120.

In the sixth embodiment, it is assumed that the image forming apparatus 101 first connects to the server connecter module 701 of the server computer 131, notifies the print control apparatus 105 of information regarding this connection, and the print control apparatus 105 that has been notified connects to the server connecter module 701. However, the order of connection is not limited to the above order, and may be opposite, as a matter of course. Furthermore, although it is assumed that the image forming apparatus 101 and the print control apparatus 105 work with each other and simultaneously establish a connection, it is possible that a connection is established with only one of these apparatuses. If this is the case, as in the case of the fifth embodiment, a setting screen for setting "linked operation" or "non-linked operation" is displayed on the operation panel 205 of the image forming apparatus 101 or the console unit 305 of the print control apparatus 105. Each apparatus may connect to the server connecter module 701 according to the setting value that has been set from the corresponding screen.

As described above, according to the sixth embodiment, the print control apparatus 105 and the image forming apparatus 101 connect to the terminal device 120 via separate remote maintenance communication paths, and the terminal device 120 is enabled to perform VNC communication with each of the apparatuses.

Seventh Embodiment

Next, a seventh embodiment will be described. In the seventh embodiment, a description will be given of processing in which whether to connect the print control apparatus 105 and the image forming apparatus 101 to the same remote maintenance communication path or separate remote maintenance communication paths is selected, and the terminal device 120 is enabled to perform VNC communication with these apparatuses. Note that the hardware configurations, etc. of the image forming apparatus 101, the terminal device 120, the print control apparatus 105, and the server computer 131 according to the seventh embodiment are the same as those in the above-described embodiments, and therefore the description thereof is omitted.

Figure 30:
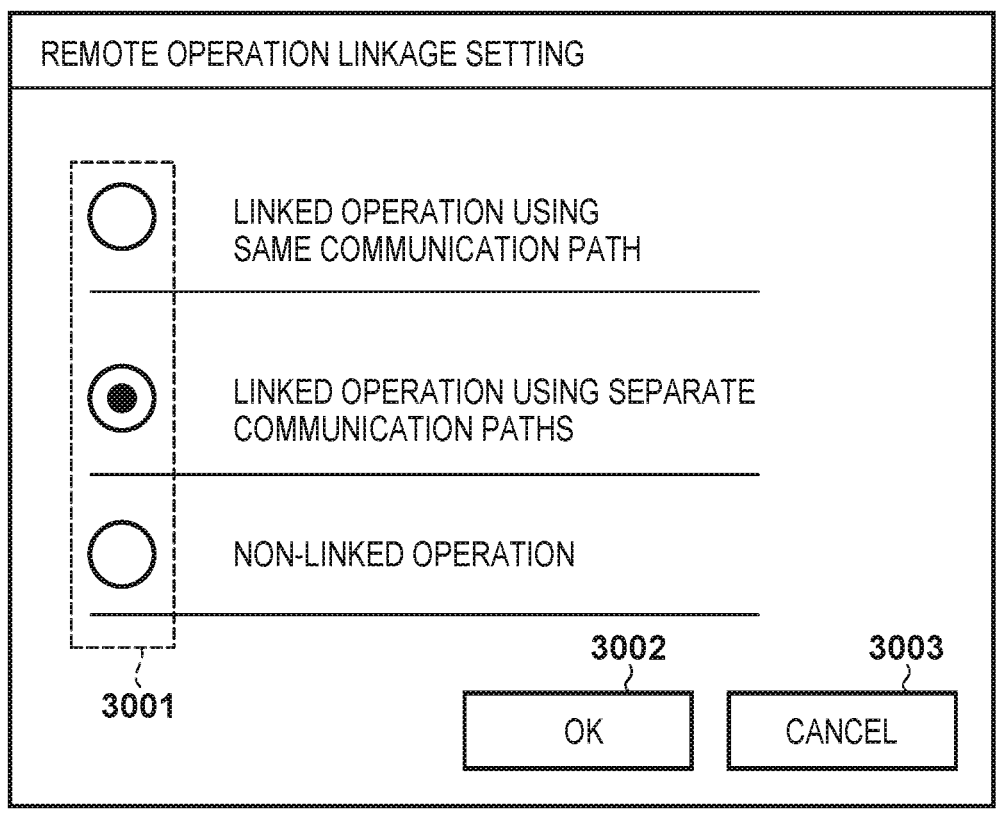
FIG. 30 depicts a view showing an example of a screen that is displayed on an operation panel of an image forming apparatus according to a seventh embodiment, and is used for linkage setting.

FIG. 30 depicts a view showing an example of a setting screen that is displayed on the operation panel 205 of the image forming apparatus 101 according to the seventh embodiment, and is used for linkage setting.

A radio button 3001 is a radio button used for setting whether or not to perform linked remote operations. Furthermore, in the case of linked remote operations, it is possible to select linked operation using the same communication path or linked operation using separate communication paths. In the case where "linked operation using the same communication path" is selected, the print control apparatus 105 and the image forming apparatus 101 described in the fifth embodiment perform remote maintenance using the same communication path. On the other hand, in the case where "linked operation using separate communication paths" is selected as shown in FIG. 30, the print control apparatus 105 and the image forming apparatus 101 described in the sixth embodiment perform remote maintenance using separate communication paths. If an OK button 3002 is pressed, the setting on this screen is saved, and if a cancel button 3003 is pressed, the setting on this screen is cancelled.

A sequence diagram showing the flow of the establishment of communication paths is described with referenced to FIGS. 21 and 27 used for describing the fifth and sixth embodiments, and the sequence in which the processing according to the seventh embodiment is taken out therefrom. A sequence that is not particularly described is the same as that in the fifth and sixth embodiments.

Figure 31:
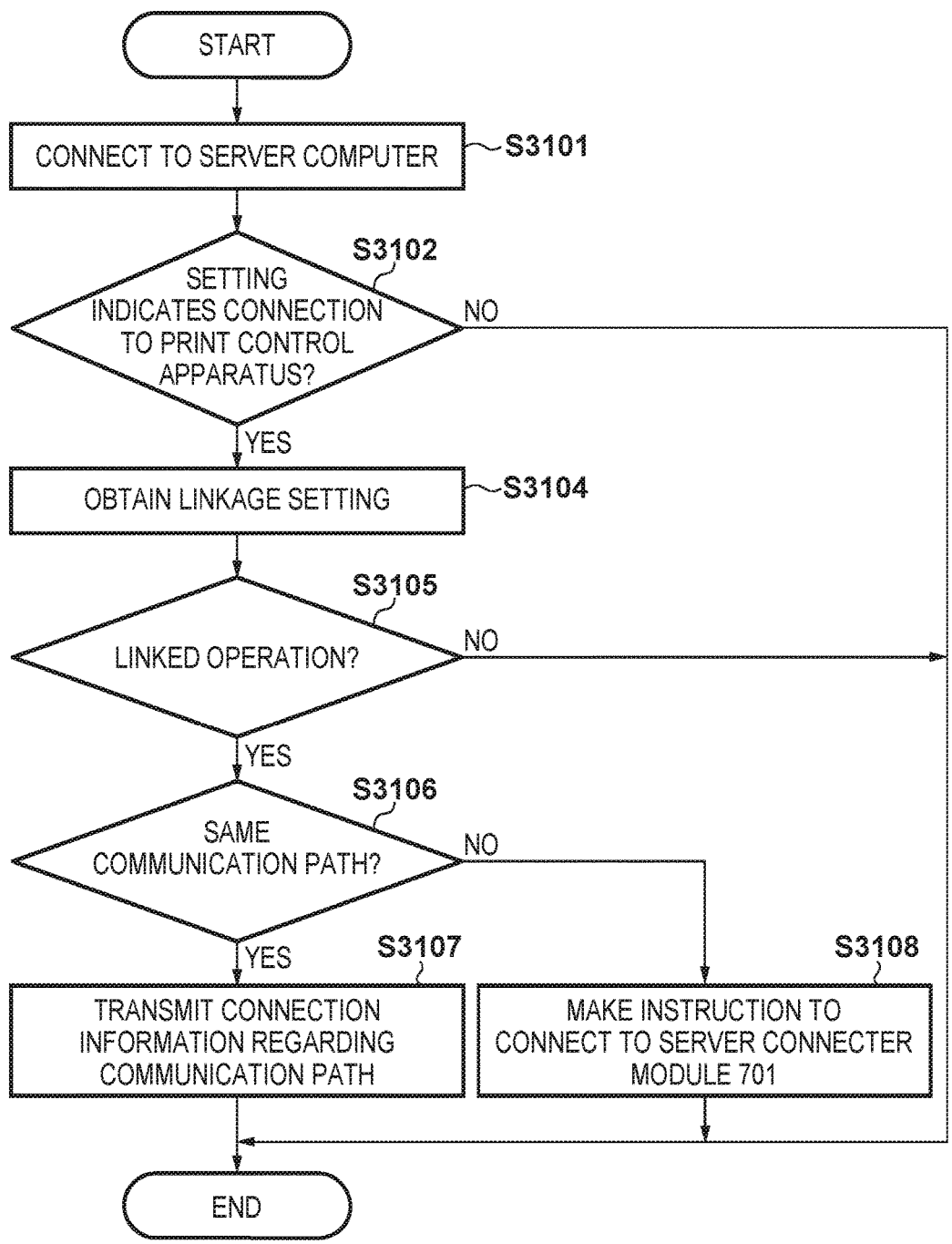
FIG. 31 is a flowchart for describing processing that is performed when a device connecter module of the image forming apparatus according to the seventh embodiment connects to a web server module of a server computer.

FIG. 31 is a flowchart for describing processing that is performed when the device connecter module 501 of the image forming apparatus 101 according to the seventh embodiment connects to the web server module 702 of the server computer 131 in steps S2102 and S2702. Note that the program executing this processing is stored in the external storage device 211, and this processing is achieved by the CPU 201 deploying the program to the RAM 202 and executing the program. Therefore, in the following description, it is assumed that the processing is executed by the modules shown in FIG. 5.

First, upon successfully connecting to the server connecter module 701 of the server computer 131 in step S3101, the processing proceeds to step S3102. In step S3102, the device connecter module 501 determines whether or not the image forming apparatus 101 has been set so as to connect to the print control apparatus 105 at this point in time. Here, if it is determined that the image forming apparatus 101 has not been set so as to connect to the print control apparatus 105, the device connecter module 501 terminates this processing. On the other hand, if it is determined in step S3102 that the image forming apparatus 101 has been set so as to connect to the print control apparatus 105, the processing proceeds to step S3104 and the device connecter module 501 obtains the linkage setting that has been set by using the radio button 3001 shown in FIG. 30. Next, the processing proceeds to step S3105, and the device connecter module 501 determines whether or not the linkage setting indicates that linked operation has been set. If the linkage setting indicates that non-linked operation has been set, the device connecter module 501 terminates this processing. On the other hand, if it is determined in step S3105 that linked operation has been set, the processing proceeds to step S3106 and the device connecter module 501 determines whether or not the linkage setting indicates linked operation using the same communication path. Here, if it is determined that the same communication path is to be used, the processing proceeds to step S3107. This is the case where the image forming apparatus 101 and the print control apparatus 105 use the same communication path for connection as described in the fifth embodiment above. Therefore, in this case, the device connecter module 501 notifies the connection destination determination module 504 of the ID number of the remote maintenance communication path (step S2104 in FIG. 21), the connection destination determination module 504 transmits the information to the print control apparatus 105 (step S2105), and this processing is terminated.

On the other hand, if it is determined in step S3106 that the same communication path is not to be used, the processing proceeds to step S3108. This is the case where the image forming apparatus 101 and the print control apparatus 105 use separate communication paths for connection as described in the sixth embodiment above. Therefore, in step S3108, the device connecter module 501 notifies the connection destination determination module 504 of remote maintenance connection (step S2704 in FIG. 27), the connection destination determination module 504 transmits this information to the print control apparatus 105 (step S2705), and this processing is terminated.

Figure 32:
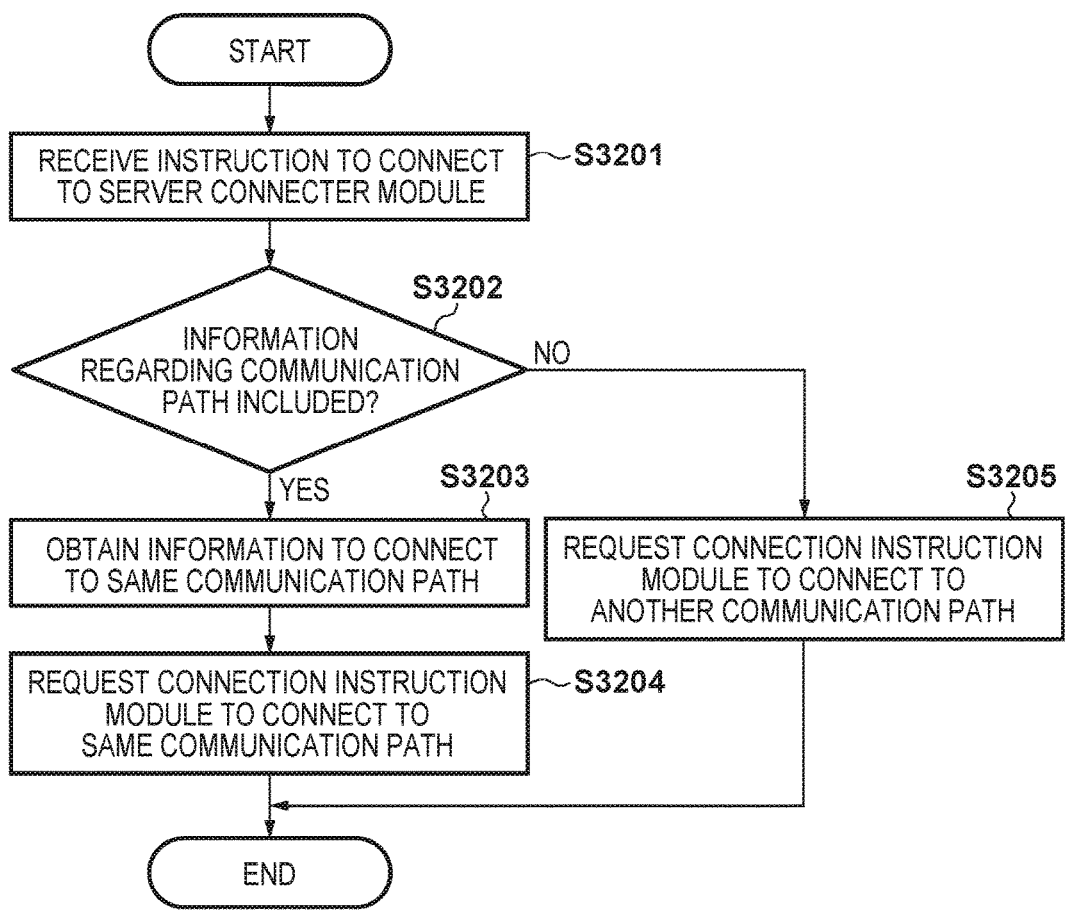
FIG. 32 is a flowchart for describing processing that is performed by a print control apparatus when receiving a remote maintenance connection notification from the image forming apparatus according to the seventh embodiment.

FIG. 32 is a flowchart for describing processing that is performed by the print control apparatus 105 when receiving a remote maintenance connection notification from the image forming apparatus 101 according to the seventh embodiment. Note that the program executing this processing is stored in the external storage device 309, and this processing is achieved by the CPU 301 deploying the program to the RAM 302 and executing the program.

Upon the connection information reception module 2004 receiving a remote maintenance connection notification in step S3201 (an instruction to connect to the server connecter module 701), the processing proceeds to step S3202. In step S3202, the connection information reception module 2004 determines whether a connection ID that identifies a remote maintenance communication path is included in the notification. If it is determined that a connection ID is included in the notification, the processing proceeds to step S3203 to obtain information that is necessary to connect to the same communication path, and the processing proceeds to step S3204. In step S3204, the connection information reception module 2004 submits a request to the connection instruction module 2002 to connect to the remote maintenance communication path indicated by the connection ID (step S2706 in FIG. 27), and terminates this processing. If the connection information reception module 2004 determines in step S3202 that the connection ID of a remote maintenance communication path is not included, the processing proceeds to step S3205. In step S3205, the connection information reception module 2004 submits an instruction to the connection instruction module 2002 to connect to another communication path (step S2706), and terminates this processing.

As described above, according to the seventh embodiment, it is possible to determine whether the print control apparatus and the image forming apparatus are to be connected to the same remote maintenance communication path or separate remote maintenance communication paths.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-012792, filed Jan. 26, 2016 which is hereby incorporated by reference herein in its entirety.

What is claimed is:

1. A communication system in which a remote supporting apparatus and a print server are connected via a server apparatus, and a printer is connected to the print server,
wherein the remote supporting apparatus comprises:
a first memory device that stores a set of instructions; and
at least one processor that executes instructions out of the instructions to
transmit a remote control connection request to the printer via the server apparatus and the print server,
the print server comprises:
a second memory device that stores a set of instructions; and
at least one processor that executes instructions out of the instructions to
relay communication between the remote supporting apparatus and the printer, and
the printer comprises:
a third memory device that stores a set of instructions; and
at least one processor that executes instructions out of the instructions to:

in accordance with receiving the remote control connection request from the remote supporting apparatus via the server apparatus and the print server, transfer the remote control connection request to the print server to control the print server by the printer; and execute remote control communication with the remote supporting apparatus via the server apparatus and the print server, and perform remote control communication with the print server to control the print server by the printer.

2. The communication system according to claim 1, wherein the at least one processor of the remote supporting apparatus further executes instructions out of the instructions stored in the first memory device to display a screen that allows a user to select a connection destination to which the remote control connection request is to be transmitted.

3. The communication system according to claim 1, wherein the printer further comprises a Virtual Network Computing (VNC) server that transmits the operation screen for the print server to the VNC client, and wherein the at least one processor of the printer further executes instructions out of the instructions stored in the third memory device to determine whether to transmit the VNC connection request to the VNC server or to the print server.

4. The communication system according to claim 1, wherein the at least one processor of the printer further executes instructions out of the instructions stored in the third memory device to:

determine whether or not the print server has been activated;

upon determining that the print server has been activated, transfer the remote control communication to the print server to control the print server by the printer; and in accordance with determining that the print server has not been activated, perform the remote control communication with the remote supporting apparatus via the print server without transferring the remote control communication to the information processing apparatus print server.

5. The communication system according to claim 1, wherein the at least one processor of the print server further executes instructions out of the instructions stored in the second memory device to:

determine whether or not a function that is required for the remote control communication with the printer has been activated; and in accordance with determining that the function has not been activated, confirm with a user whether or not to activate the function.

6. The communication system according to claim 1, wherein the at least one processor of the printer further executes instructions out of the instructions stored in the third memory device to:

select one of the print server and the printer as an apparatus that performs processing corresponding to the remote control connection request; and perform control to determine whether to perform the processing between the printer and the remote supporting apparatus by using the print server, or perform the processing between the printer and the remote supporting apparatus without using the print server.

7. The communication system according to claim 1, wherein the at least one processor of the remote supporting apparatus further executes instructions out of the instructions stored in the first memory device to select a connection destination of connection as per the remote control connection request, wherein the processor of the printer performs control to determine whether to perform the processing between the printer and the remote supporting apparatus by using the print server, or perform the processing between the printer and the remote supporting apparatus without using the print server, based on the connection destination thus selected.

8. The communication system according to claim 1, wherein the processor of the printer further executes instructions out of the instructions stored in the third memory device to:

determine whether or not the printer has been set so as to work with the print server; and in accordance with determining that the printer has been set so as to work with the print server, perform control to transfer the remote control communication to the print server.

9. A printer that is configured to be connected to a remote supporting apparatus via a server apparatus and a print server, comprising:

a memory device that stores a set of instructions; and at least one processor that executes instructions out of the instructions to:

perform control to establish a connection between the printer and a server apparatus via the server apparatus and the print server; and in accordance with receiving a remote control connection request from a remote supporting apparatus via the established connection perform control to execute a remote control communication with the print server to control the print server by the printer.

10. The printer according to claim 9, wherein the at least one processor of the printer executes instructions out of the instructions to:

receive from the print server image data that has undergone raster image processor processing.

11. A print server configured to be connected between a network and a printer, the print server comprising:

a memory device that stores a set of instructions; and at least one processor that executes instructions out of the instructions to:

relay remote control communication between a remote supporting apparatus and the printer via a server apparatus;

receive, in accordance with the printer receiving a first remote connection request from the remote supporting apparatus, a second request from the printer to perform remote control communication to control the print server by the printer;

in accordance with receiving the second request, perform a remote control communication with the printer to control the print server by the printer.

12. The print server according to claim 11, wherein the at least one processor of the printer executes instructions out of the instructions to:

transmit to the printer image data that has undergone raster image processor processing.

13. A remote supporting apparatus configured to be connected to, via a network, a print server to which a printer is connected, the remote supporting apparatus comprising:

a memory device that stores a set of instructions; and at least one processor that executes instructions out of the instructions to:

establish a connection with a printer via a server apparatus and a print server;

request, via the established connection, the printer to establish a remote control connection with the printer, wherein the printer performs a remote control communication with the print server to control the print server by the printer in accordance with the remote control connection being established;

control the print server by controlling the printer through the remote control connection with the printer which performs the remote control communication with the print server.

14. The remote supporting apparatus according to claim 13, wherein the print server transmits to the printer image data that has undergone raster image processor processing.

15. A method for controlling a communication system in which a remote supporting apparatus and a print server are connected via a server apparatus, and a printer is connected to the print server, the method comprising:

transmitting, for the remote supporting apparatus, a remote control connection request to the printer via the server apparatus and the print server;

relaying, for the print server, communication between the remote supporting apparatus and the printer;

in accordance with receiving the remote control connection request from the remote supporting apparatus via the server apparatus and the print server, transferring, for the printer, the remote control connection request to the print server to control the print server by the printer; and executing, for the printer, remote control communication with the remote supporting apparatus via the server apparatus and the print server, and performing remote control communication with the print server to control the print server.

16. A method of controlling a printer connected to a network via a server apparatus and a print server, the method comprising:

performing control to establish a connection between the printer and a server apparatus via the server apparatus and the print server; and in accordance with receiving a remote control connection request from a remote supporting apparatus via the established connection, performing control to execute a remote control communication with the print server to control the print server by the printer.

17. A method of controlling a print server connected between a network and a printer, the method comprising:

relaying remote control communication between a remote supporting apparatus and the printer via a server apparatus;

receiving, in accordance with the printer receiving a first remote connection request from the remote supporting apparatus, a second request from the printer to perform remote control communication to control the print server by the printer; and in accordance with receiving the second request, performing a remote control communication with the printer to control the print server by the printer.

18. A non-transitory computer-readable storage medium storing a program for causing a processor to execute a method of controlling a printer connected to a network via a server apparatus and a printer server, the method comprising:

performing control to establish a connection between the printer and a server apparatus via the server apparatus and the print server; and in accordance with receiving a remote control connection request from a remote supporting apparatus via the established connection, performing control to execute a remote control communication with the print server to control the print server by the printer.

19. A non-transitory computer-readable storage medium storing a program for causing a processor to execute a method of controlling a print server connected between a network and a printer, the method comprising:

relaying remote control communication between a remote supporting apparatus and the printer via a server apparatus;

receiving, in accordance with the printer receiving a first remote connection request from the remote supporting apparatus, a second request from the printer to perform remote control communication to control the print server by the printer; and in accordance with receiving the second request, performing a remote control communication with the printer to control the print server by the printer.

* * * * *